（12）United States Patent
Kuo

(10) Patent No.: US 10,670,837 B2
(45) Date of Patent: Jun. 2, 2020

(54) OPTICAL IMAGE CAPTURING LENS ASSEMBLY, IMAGING APPARATUS AND ELECTRONIC DEVICE

(71) Applicant: LARGAN PRECISION CO., LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 108 days.

(21) Appl. No.: 15/843,112

(22) Filed: Dec. 15, 2017

(65) Prior Publication Data

US 2019/0025551 A1 Jan. 24, 2019

(30) Foreign Application Priority Data

Jul. 19, 2017 (TW) .............................. 106124171 A

(51) Int. Cl.
| | |
|---|---|
| *G02B 13/00* | (2006.01) |
| *G02B 9/64* | (2006.01) |
| *G02B 13/24* | (2006.01) |
| *G03B 29/00* | (2006.01) |
| *G02C 11/00* | (2006.01) |

(52) U.S. Cl.
CPC ............ *G02B 13/0045* (2013.01); *G02B 9/64* (2013.01); *G02B 13/24* (2013.01); *G02C 11/10* (2013.01); *G03B 29/00* (2013.01)

(58) Field of Classification Search
CPC ............ G02B 13/0045; G02B 13/0015; G02B 13/001; G02B 13/18; G02B 13/24; G02B 9/64; G02B 27/0025; G02B 27/005; G02B 3/02; G02B 3/04

USPC ................ 359/708, 713, 751, 755, 754, 682
See application file for complete search history.

(56) References Cited

U.S. PATENT DOCUMENTS

| | | |
|---|---|---|
| 9,703,078 B1 | 7/2017 | Teraoka |
| 9,759,894 B2 | 9/2017 | Teraoka |
| 9,835,832 B2 | 12/2017 | Teraoka |
| 2015/0009578 A1 | 1/2015 | Shinohara et al. |
| 2016/0124191 A1 | 5/2016 | Hashimoto |

(Continued)

FOREIGN PATENT DOCUMENTS

| | | |
|---|---|---|
| CN | 105116519 A | 12/2015 |
| CN | 105866921 A | 8/2016 |

(Continued)

OTHER PUBLICATIONS

Dai et al., (of record, see information disclosure dated Jul. 26, 2019, machine English language translation) WO2018214349, (Year: 2017).*

*Primary Examiner* — Marin Pichler
(74) *Attorney, Agent, or Firm* — McClure, Qualey & Rodack, LLP

(57) ABSTRACT

An optical image capturing lens assembly includes seven lens elements, which are, in order from an object side to an image side, a first lens element, a second lens element, a third lens element, a fourth lens element, a fifth lens element, a sixth lens element and a seventh lens element. The second lens element has negative refractive power. The sixth lens element has an object-side surface and an image-side surface being both aspheric. At least one of object-side surfaces and image-side surfaces of the fifth lens element and the sixth lens element includes at least one critical point in an off-axial region thereof.

24 Claims, 21 Drawing Sheets

(56) References Cited

U.S. PATENT DOCUMENTS

| | | |
|---|---|---|
| 2016/0241756 A1 | 8/2016 | Chen |
| 2016/0282587 A1 | 9/2016 | Hashimoto |
| 2017/0082834 A1 | 3/2017 | Tang et al. |
| 2017/0082835 A1 | 3/2017 | Tang et al. |
| 2017/0090157 A1 | 3/2017 | Tang et al. |
| 2017/0090158 A1 | 3/2017 | Tang et al. |
| 2017/0199350 A1 | 7/2017 | Teraoka |
| 2017/0199351 A1 | 7/2017 | Teraoka |
| 2017/0199352 A1 | 7/2017 | Teraoka |
| 2017/0199353 A1 | 7/2017 | Teraoka |
| 2017/0285305 A1* | 10/2017 | Lai .................... G02B 5/005 |
| 2018/0180855 A1 | 6/2018 | Baik et al. |

FOREIGN PATENT DOCUMENTS

| | | |
|---|---|---|
| CN | 105866924 A | 8/2016 |
| CN | 105866925 A | 8/2016 |
| CN | 105892011 A | 8/2016 |
| JP | 2015072403 A | 4/2015 |
| JP | 2015072405 A | 4/2015 |
| WO | 2016109938 A1 | 7/2016 |
| WO | 2018214349 A1 | 11/2018 |

* cited by examiner

OPTICAL IMAGE CAPTURING LENS ASSEMBLY, IMAGING APPARATUS AND ELECTRONIC DEVICE

RELATED APPLICATIONS

This application claims priority to Taiwan Application Serial Number 106124171, filed Jul. 19, 2017, which is herein incorporated by reference.

BACKGROUND

Technical Field

The present disclosure relates to an optical image capturing lens assembly and an imaging apparatus. More particularly, the present disclosure relates to an optical image capturing lens assembly and an imaging apparatus with a wide field of view applicable to electronic devices.

Description of Related Art

With recent technology advances, requirements for image quality of photographing modules are increased. However, pixel size of image sensors is limited by development of semiconductor process. Therefore, in order to obtain images with higher quality, photographing module is required to be configured with an imaging lens assembly having a size-enough image surface. Also, requirements for miniaturized image lens assembly have been fulfilled by development of portable devices, such as smartphone. In addition, with wider application of photographing modules, photographing modules need to obtain enough field of view in general so as to meet photographing demands, and with applications in dynamic photography and night photography of the photographing module, demands for photographing modules with large apertures are also increased.

In conventional photographing module having seven lens elements, a balance among large aperture, wide field of view, compactness and high image quality is hard to be obtained due to surface shape selection of the sixth lens element.

SUMMARY

According to one aspect of the present disclosure, an optical image capturing lens assembly includes seven lens elements, which are, in order from an object side to an image side, a first lens element, a second lens element, a third lens element, a fourth lens element, a fifth lens element, a sixth lens element and a seventh lens element. The second lens element has negative refractive power, both of an object-side surface and an image-side surface of the sixth lens element are aspheric, and at least one of object-side surfaces and image-side surfaces of the fifth lens element and the sixth lens element includes at least one critical point in an off-axis region thereof. When a focal length of the optical image capturing lens assembly is f, a curvature radius of the object-side surface of the sixth lens element is R11, a curvature radius of the image-side surface of the sixth lens element is R12, an axial distance between an object-side surface of the first lens element and an image surface is TL, a maximum image height of the optical image capturing lens assembly is ImgH, and an entrance pupil diameter of the optical image capturing lens assembly is EPD, the following conditions are satisfied:

$$f/|R11|+f/|R12|<1.35; \text{ and}$$

$$1.00<TL\times TL/(ImgH\times EPD)<3.25.$$

According to another aspect of the present disclosure, an imaging apparatus includes the optical image lens assembly according to the aforementioned aspect and an image sensor, wherein the image sensor is disposed on the image-side surface of the optical image lens assembly.

According to yet another aspect of the present disclosure, an electronic device includes the imaging apparatus according to the aforementioned aspect.

According to still another aspect of the present disclosure, an optical image capturing lens assembly includes seven lens elements, which are, in order from an object side to an image side, a first lens element, a second lens element, a third lens element, a fourth lens element, a fifth lens element, a sixth lens element and a seventh lens element. The second lens element has negative refractive power, both of an object-side surface and an image-side surface of the sixth lens element are aspheric, and at least one of object-side surfaces and image-side surfaces of the fourth lens element, the fifth lens element, the sixth lens element and the seventh lens element includes at least one critical point in an off-axis region thereof. When a focal length of the optical image capturing lens assembly is f, a curvature radius of the object-side surface of the sixth lens element is R11, a curvature radius of the image-side surface of the sixth lens element is R12, an axial distance between an object-side surface of the first lens element and an image surface is TL, a maximum image height of the optical image capturing lens assembly is ImgH, and an entrance pupil diameter of the optical image capturing lens assembly is EPD, the following conditions are satisfied:

$$f/|R11|+f/|R12|<1.25; \text{ and}$$

$$1.00<TL\times TL/(ImgH\times EPD)<3.25.$$

According to further still another aspect of the present disclosure, an imaging apparatus includes the aforementioned optical image capturing lens assembly and an image sensor, wherein the image sensor is disposed on the image surface of the optical image capturing lens assembly.

According to more still another aspect of the present disclosure, an electronic device includes the imaging apparatus according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
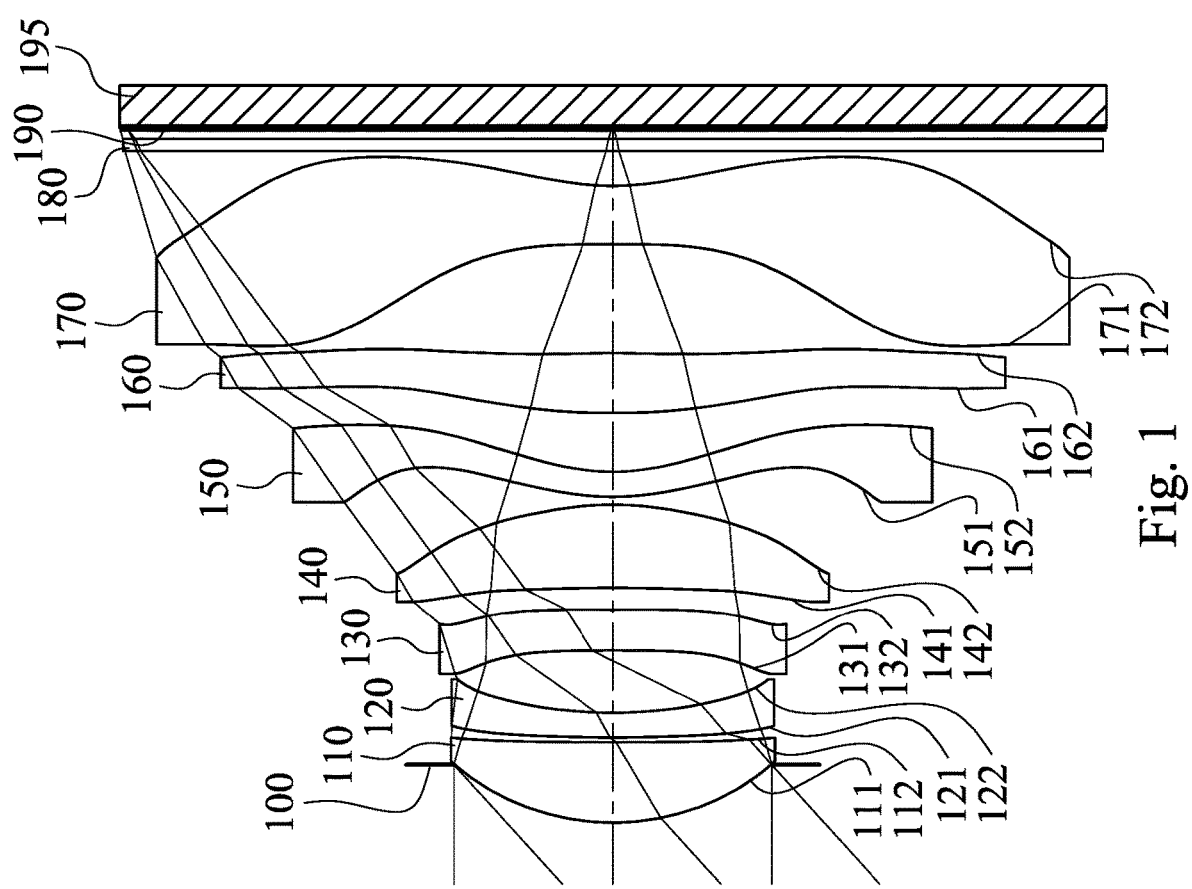
FIG. 1 is a schematic view of an optical image capturing lens assembly according to the 1st embodiment of the present disclosure.

An optical image capturing lens assembly includes seven lens elements, which are, in order from an object side to an image side, a first lens element, a second lens element, a third lens element, a fourth lens element, a fifth lens element, a sixth lens element and a seventh lens element.

The first lens element can have positive refractive power. Therefore, the total track length of the optical image capturing lens assembly can be reduced. The first lens element can have an object-side surface being convex in a paraxial region thereof. Therefore, it is favorable for providing sufficient positive refractive power to the first lens element so as to reduce the total track length of the optical image capturing lens assembly. The first lens element can have an image-side surface being concave in a paraxial region thereof, so that it is favorable for correcting astigmatism.

The second lens element has negative refractive power. Therefore, spherical aberration and chromatic aberration generated from the first lens element can be balanced so as to reduce colour cast and enhance the sharpness of the image.

The third lens element can have an object-side surface being concave in a paraxial region thereof. Therefore, it is favorable for correcting astigmatism generated by the first lens element and the second lens element.

The sixth lens element can have an object-side surface including at least one inflection point in an off-axis region thereof, so that it is favorable for reducing the curvature of the object-side surface of the sixth lens element, and the forming difficulty of the sixth lens element can be reduced. Moreover, each the object-side surface and an image-side surface of the sixth lens element can include at least one critical point in an off-axis region thereof, so that off-axis aberrations can be corrected and the size of the optical image capturing lens assembly can be reduced.

The seventh lens element can have negative refractive power. Therefore, the principal point of the optical image capturing lens assembly can be positioned closer to the object side, so that a back focal length can be reduced so as to reduce the total track length thereof. The seventh lens element can have an object-side surface being convex in a paraxial region thereof. Therefore, the generation of astigmatism can be reduced. The seventh lens element can have an image-side surface being concave in a paraxial region thereof, so that it is favorable for obtaining the compactness of the optical image capturing lens assembly by adjusting the back focal length thereof. The image-side surface of the seventh lens element can include at least one convex critical point in the paraxial region thereof, so that off-axis aberrations can be corrected and the surface reflections of the light in a peripheral region can be reduced.

At least one of object-side surfaces and image-side surfaces of the fourth lens element, the fifth lens element, the sixth lens element and the seventh lens element can include at least one critical point in an off-axis region thereof. Therefore, it is favorable for correcting off-axis aberrations, and the size of the optical image capturing lens assembly can be reduced. Preferably, at least one of object-side surfaces and image-side surfaces of the fifth lens element and the sixth lens element can include at least one critical point in the off-axis region thereof, so that off-axis aberrations can be further corrected. More preferably, the object-side surfaces of the fifth lens element and the sixth lens element can include at least one concave critical point in the off-axis region thereof, so that the surface reflections of light in a peripheral region can be reduced so as to enhance relative illumination on the off-axis region of the image surface. Furthermore, the object-side surface of the sixth lens element can include at least one concave critical point in the off-axis region thereof, so that off-axis aberrations can be further corrected and the sensitivity can also be reduced.

When a focal length of the optical image capturing lens assembly is f, a curvature radius of the object-side surface of the sixth lens element is R11, and a curvature radius of the image-side surface of the sixth lens element is R12, the following condition can be satisfied: f/|R11|+f/|R12|<1.35. Therefore, it is favorable for controlling the surface shape of the sixth lens element, so that the variation of the surface shape in the off-axis region thereof can be enhanced so as to correct off-axis aberrations and reduce the size of the optical image capturing lens assembly. Preferably, the following condition can be satisfied: f/|R11|+f/|R12|<1.25. More preferably, the following condition can be satisfied: f/|R11|+f/|R12|<0.95. Furthermore, the following condition can also be satisfied: f/|R11|+f/|R12|<0.60.

When an axial distance between an object-side surface of the first lens element and an image surface is TL, a maximum image height of the optical image capturing lens assembly is ImgH, and an entrance pupil diameter of the optical image capturing lens assembly is EPD, the following condition can be satisfied: 1.00<TL×TL/(ImgH×EPD) <3.25. Therefore, a proper balance for reducing the total track length, increasing the area of the image surface and maintaining the illumination on the image surface can be obtained, so that it is favorable for forming the optical image capturing lens assembly with wide field of view and high image quality.

When an Abbe number of the third lens element is V3, and an Abbe number of the fourth lens element is V4, the following condition can be satisfied: $1.5<(V3+V4)/|V3-V4|<10$. Therefore, chromatic aberration can be reduced by the corresponding configuration of the third lens element and the fourth lens element. Preferably, the following condition can be satisfied: $1.7<(V3+V4)/|V3-V4|<3.5$.

When a central thickness of the sixth lens element is CT6, and a central thickness of the seventh lens element is CT7, the following condition can be satisfied: $0.10<CT6/CT7<1.50$. Therefore, the thicknesses of the sixth lens element and the seventh lens element are proper, so that off-axis aberrations can be corrected by the corresponding configuration of the sixth lens element and the seventh lens element. Preferably, the following condition can be satisfied: $0.20<CT6/CT7<1.14$.

When the focal length of the optical image capturing lens assembly is f, a focal length of the sixth lens element is f6, and a focal length of the seventh lens element is f7, the following condition can be satisfied: $-0.9<(f/f6)+(f/f7)<1.0$. Therefore, the refractive powers of the sixth lens element and the seventh lens element can be restricted within a proper range, so that it is favorable for correcting off-axis aberrations and reducing the size of the optical image capturing lens assembly.

When an f-number of the optical image capturing lens assembly is Fno, the following condition can be satisfied: $1.0<Fno<1.7$. Therefore, a sufficient and proper illumination on the image surface can be obtained.

When the axial distance between the object-side surface of the first lens element and the image surface is TL, and the maximum image height of the optical image capturing lens assembly is ImgH, the following condition can be satisfied: $1.0<TL/ImgH\leq1.6$. Therefore, a proper balance of the optical image capturing lens assembly between shortening the total track length and increasing the area of the image surface can be obtained.

When the entrance pupil diameter of the optical image capturing lens assembly is EPD, and a curvature radius of the image-side surface of the seventh lens element is R14, the following condition can be satisfied: $0.90<EPD/R14<10$. Therefore, the size of an aperture stop and the surface shape of the seventh lens element can be adjusted properly, so that it is favorable for obtaining a proper balance between increasing the illumination on the image surface and reducing the size of the optical image capturing lens assembly.

When a maximum effective radius of the image-side surface of the sixth lens element is Y62, and a maximum effective radius of the image-side surface of the seventh lens element is Y72, the following condition can be satisfied: $1.05<Y72/Y62<1.35$. Therefore, an incident angle and an exit angle of the light in a peripheral region can be within a proper range by adjusting the outer diameters of the sixth lens element and the seventh lens element, so that it is favorable for obtaining a balance between increasing the area of the image surface and reducing the incident angle of light on the image surface.

At least one of Abbe numbers of the first lens element, the second lens element, the third lens element, the fourth lens element, the fifth lens element, the sixth lens element and the seventh lens element is smaller than 20. Therefore, it is favorable for reducing aberrations, such as chromatic aberration, by properly adjusting distribution of the Abbe numbers of the optical image capturing lens assembly. More preferably, at least two of the Abbe numbers of the first lens element, the second lens element, the third lens element, the fourth lens element, the fifth lens element, the sixth lens element and the seventh lens element are smaller than 20.

At least three of the Abbe numbers of the first lens element, the second lens element, the third lens element, the fourth lens element, the fifth lens element, the sixth lens element and the seventh lens element are smaller than 40. Therefore, chromatic aberration generated by the optical image capturing lens assembly can be corrected, and a material with low Abbe number can have higher refractive index so as to correct off-axis aberrations.

When the focal length of the optical image capturing lens assembly is f, and a focal length of the third lens element is f3, the following condition can be satisfied: $0.30<|f3/f|<20$. Therefore, a proper refractive power range of the third lens element can be maintained, so that it is favorable for adjusting distribution of the refractive power of the optical image capturing lens assembly so as to obtain a balance between increasing the field of view and reducing the size.

When the focal length of the optical image capturing lens assembly is f, and a focal length of the fourth lens element is f4, the following condition can be satisfied: $0.30<|f4/f|<10$. Therefore, a proper refractive power range of the fourth lens element can be maintained, so that it is favorable for adjusting the position of the principal point so as to facilitate the incident angle of the light on the image surface to fall in a proper range and maintain the illumination on the image surface.

When the focal length of the optical image capturing lens assembly is f, and a focal length of the seventh lens element is f7, the following condition can be satisfied: $|f/f7|<1.25$. Therefore, an excessive refractive power of the seventh lens element can be avoided, so that it is favorable for correcting off-axis aberrations and maintaining a proper back focal length.

When a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, and a maximum refractive index among N1, N2, N3, N4, N5, N6 and N7 is Nmax, the following condition can be satisfied: $1.65\leq Nmax$. Therefore, it is favorable for reducing the size of the optical image capturing lens assembly and correcting aberrations by a characteristic of refracting light easily for a material with high refractive index.

When an axial distance between the object-side surface of the first lens element and the image-side surface of the seventh lens element is TD, the following condition can be satisfied: $TD<7$ mm. Therefore, demand of compactness of the optical image capturing lens assembly can be satisfied.

When the axial distance between the object-side surface of the first lens element and the image surface is TL, and the entrance pupil diameter of the optical image capturing lens assembly is EPD, the following condition can be satisfied: $1.0<TL/EPD\leq2.3$. Therefore, the total track length of the optical image capturing lens assembly can be reduced and the entering quantity of light can be enhanced so as to increase the illumination on the image surface, and it is favorable for maintaining the size of the optical image capturing lens assembly.

Each of the aforementioned features of the optical image capturing lens assembly of the present disclosure can be utilized in numerous combinations, so as to achieve the corresponding functionality.

According to the optical image capturing lens assembly of the present disclosure, the lens elements of the optical image capturing lens assembly can be made of plastic materials or glass materials. When the lens element is made of a plastic material, the manufacturing cost can be reduced. When the lens element is made of a glass material, the arrangement of refractive power of the optical image capturing lens assembly can be more flexible to design. Furthermore, the object-side surface and the image-side surface of the optical image capturing lens assembly can be aspheric (ASP). The aspherical surface can be easily made into a surface shape other than a sphere and more controllable variables can be obtained so as to reduce aberrations and further decrease the required number of the lens elements. Thus, the total track length of the optical image capturing lens assembly of the present disclosure can be efficiently reduced.

According to the optical image capturing lens assembly of the present disclosure, when the lens elements of the optical image capturing lens assembly have surfaces being convex and the convex surface position is not defined, it indicates that the aforementioned surfaces of the lens elements can be convex in the paraxial region thereof. When the lens elements of the optical image capturing lens assembly have surfaces being concave and the concave surface position is not been defined, it indicates that the aforementioned surfaces of the lens elements can be concave in the paraxial region thereof. The lens element of the optical image capturing lens assembly having positive refractive power or negative refractive power, or the focal length of the lens element, all can be referred to the refractive power, or the focal length, in the paraxial region of the lens element.

According to the optical image capturing lens assembly of the present disclosure, the optical image capturing lens assembly can include at least one stop for eliminating stray light and thereby improving image resolution thereof.

According to the optical image capturing lens assembly of the present disclosure, the image surface of the optical image capturing lens assembly, based on the corresponding image sensor, can be flat or curved. In particular, the image surface can be a concave curved surface facing towards the object side. Furthermore, the optical image capturing lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

According to the optical image capturing lens assembly of the present disclosure, the aperture stop can be configured as a front stop or a middle stop. A front stop disposed between an object and the first lens element can provide a longer distance between an exit pupil of the photographing optical lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the photographing optical lens assembly and thereby provides a wider field of view for the same.

According to the optical image capturing lens assembly of the present disclosure, a critical point is a non-axial point of the lens surface where its tangent is perpendicular to the optical axis.

According to the optical image capturing lens assembly of the present disclosure, the definition of the inflection point is a point on a curve of a lens surface ranging from a paraxial region to an off-axis region where the center of curvature of the curve changes from the object side to the image side (or from the image side to the object side).

According to the optical image capturing lens assembly of the present disclosure, the optical image capturing lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the optical image capturing lens assembly of the present disclosure, an imaging apparatus is provided. The imaging apparatus includes the optical image capturing lens assembly and an image sensor, wherein the image sensor is disposed on the image surface of the optical image capturing lens assembly. By adjusting the surface shape of the sixth lens element and the ratio of the total track length, the image height and the size of the aperture of the optical image capturing lens assembly, the optical image capturing lens assembly with large aperture, high image quality, compactness and wide field of view can be obtained. Preferably, the imaging apparatus can further include a barrel member, a holder member or a combination thereof.

According to the present disclosure, an electronic device is provided, which includes the aforementioned imaging apparatus. Preferably, the electronic device can further include but not limited to a control unit, a display, a storage unit, a random-access memory unit (RAM) or a combination thereof.

According to the above description of the present disclosure, the following 1st-11th specific embodiments are provided for further explanation.

1st Embodiment

Figure 2:
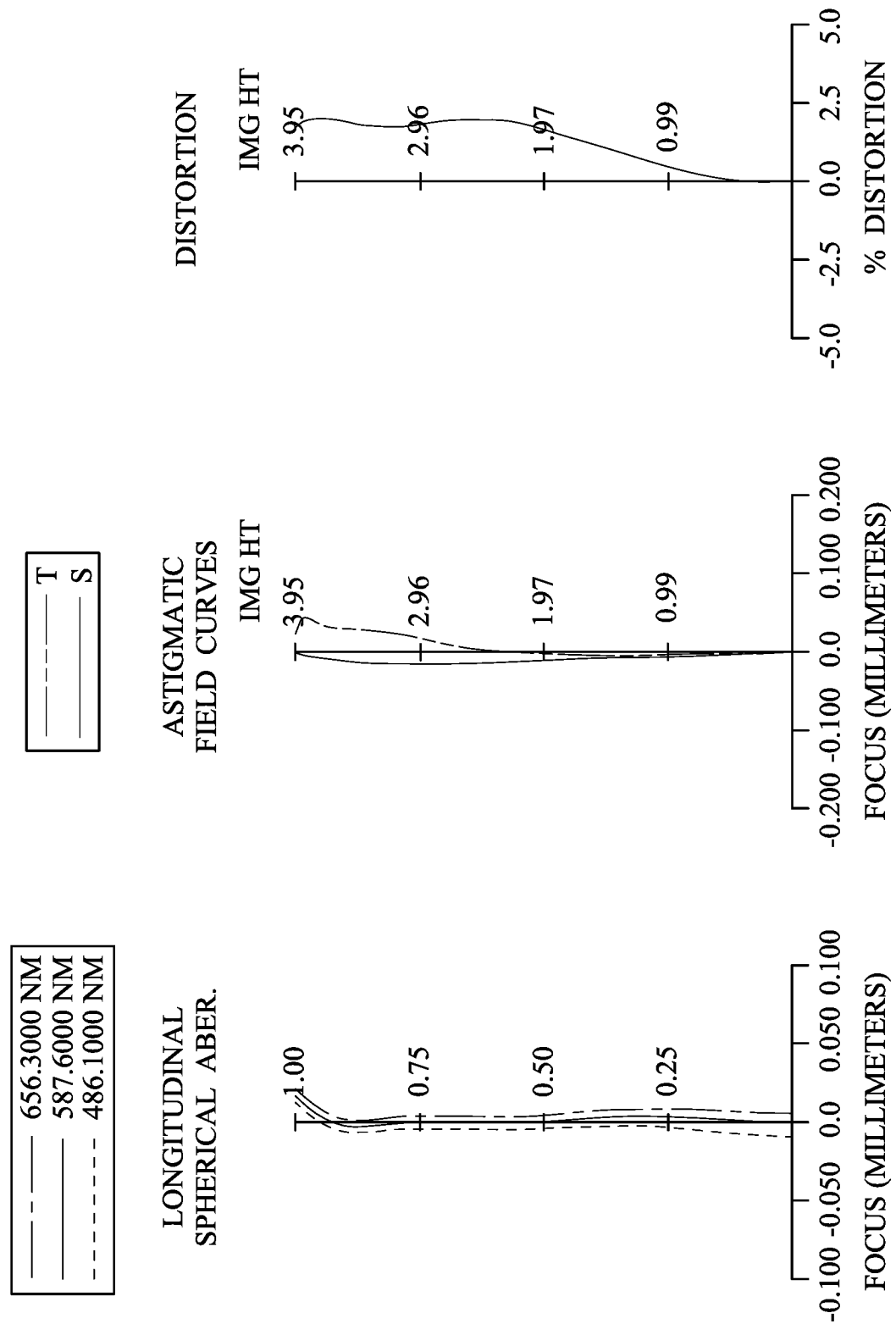
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an optical image capturing lens assembly (its reference numeral is omitted) and an image sensor 195. The optical image capturing lens assembly includes, in order from an object side to an image side, an aperture stop 100, a first lens element 110, a second lens element 120, a third lens element 130, a fourth lens element 140, a fifth lens element 150, a sixth lens element 160, a seventh lens element 170, an IR-cut filter 180 and an image surface 190. The image sensor 195 is disposed on the image surface 190 of the optical image capturing lens assembly. The optical image capturing lens assembly includes seven lens elements (110, 120, 130, 140, 150, 160 and 170) without additional one or more lens elements inserted between the first lens element 110 and the seventh lens element 170.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with positive refractive power has an object-side surface. 141 being concave in a paraxial region thereof and an image-side surface 142 being convex in a paraxial region thereof. The fourth lens element 140 is made of a plastic material, and has the object-side surface 141 and the image-side surface 142 being both aspheric.

Figure 15:
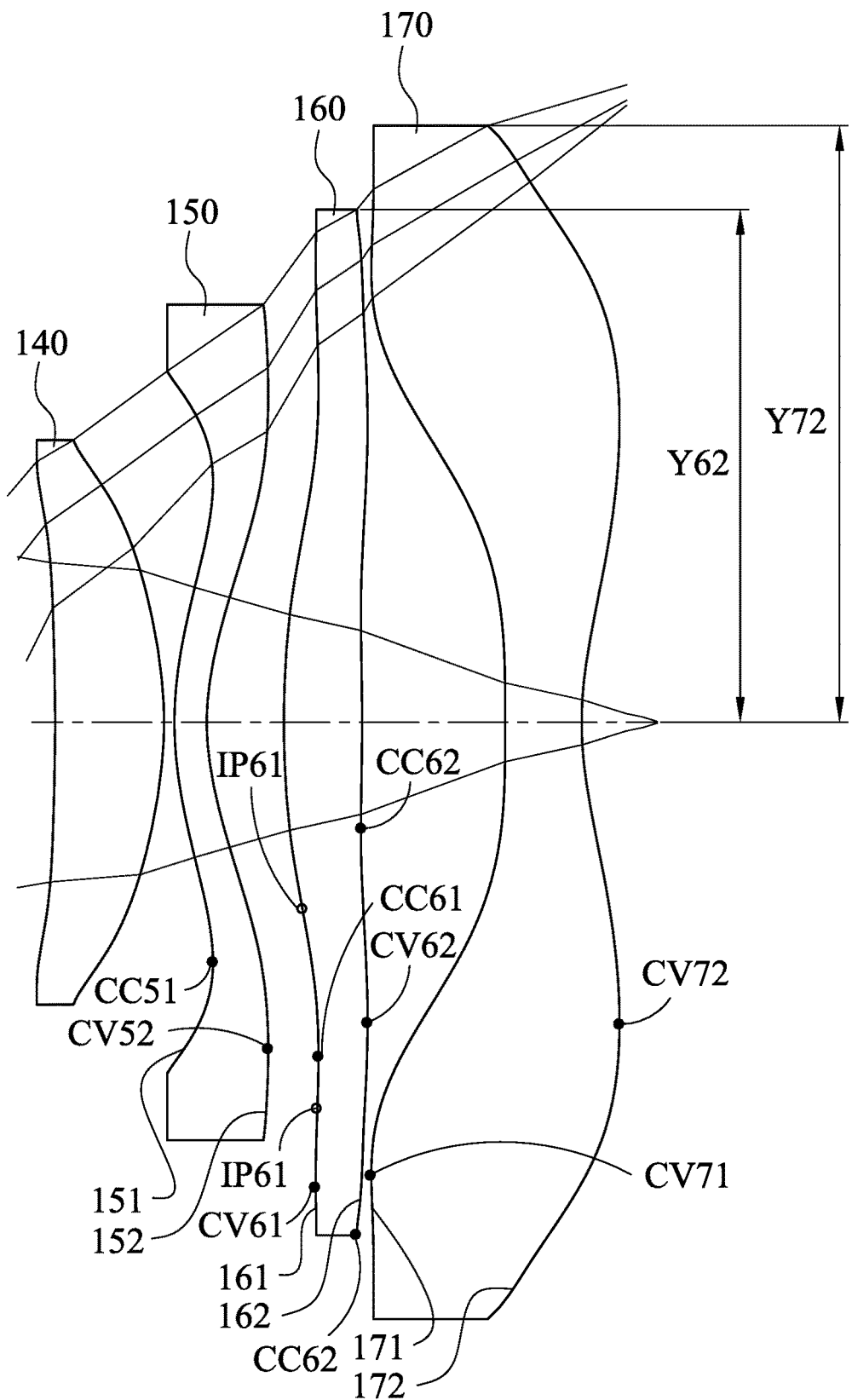
FIG. 15 is a schematic view of critical points, a parameter Y62 and a parameter Y72 according to the 1st embodiment in FIG. 1.

The fifth lens element 150 with negative refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric. Furthermore, the object-side surface 151 of the fifth lens element 150 includes at least one concave critical point CC51 (reference number is shown in FIG. 15) in an off-axis region thereof, and the image-side surface 152 of the fifth lens element 150 includes at least one convex critical point CV52 (reference number is shown in FIG. 15) in an off-axis region thereof.

The sixth lens element 160 with positive refractive power has an object-side surface 161 being convex in a paraxial region thereof and an image-side surface 162 being convex in a paraxial region thereof. The sixth lens element 160 is made of a plastic material, and has the object-side surface 161 and the image-side surface 162 being both aspheric. Furthermore, the object-side surface 161 of the sixth lens element 160 includes at least one critical point in an off-axis region thereof. In detail, the object-side surface 161 of the sixth lens element 160 includes at least one concave critical point CC61 and at least one convex critical point CV61 (reference numbers are shown in FIG. 15) in the off-axis region thereof. Moreover, the object-side surface 161 of the sixth lens element 160 includes at least one inflection point IP61 (reference number is shown in FIG. 15) in the off-axis region thereof. The image-side surface 162 of the sixth lens element 160 includes at least one critical point in an off-axis region thereof. In detail, the image-side surface 162 of the sixth lens element 160 includes at least one concave critical point CC62 and at least one convex critical point CV62 (reference numbers are shown in FIG. 15) in the off-axis region thereof.

The seventh lens element 170 with negative refractive power has an object-side surface 171 being concave in a paraxial region thereof and an image-side surface 172 being concave in a paraxial region thereof. The seventh lens element 170 is made of a plastic material, and has the object-side surface 171 and the image-side surface 172 being both aspheric. Furthermore, each of the object-side surface 171 and the image-side surface 172 of the seventh lens element 170 includes at least one convex critical point CV71 and at least one convex critical point CV72 in an off-axis region thereof (reference numbers are shown in FIG. 15).

The IR-cut filter 180 is made of a glass material and disposed between the seventh lens element 170 and the image surface 190 and will not affect the focal length of the optical image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical image capturing lens assembly according to the 1st embodiment, when a focal length of the optical image capturing lens assembly is f, an f-number of the optical image capturing lens assembly is Fno, and half of a maximum field of view of the optical image capturing lens assembly is HFOV, these parameters have the following values: f=4.29 mm; Fno=1.66; and HFOV=42.2 degrees.

In the optical image capturing lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, and a maximum refractive index among N1, N2, N3, N4, N5, N6 and N7 is Nmax (that is, the refractive index N3 of the third lens element 130 in the 1st embodiment), the following condition is satisfied: Nmax=1.669.

In the optical image capturing lens assembly according to the 1st embodiment, when an Abbe number of the third lens element 130 is V3, and an Abbe number of the fourth lens element 140 is V4, the following condition is satisfied: (V3+V4)/|V3−V4|=2.06.

In the optical image capturing lens assembly according to the 1st embodiment, when a central thickness of the sixth lens element 160 is CT6, and a central thickness of the seventh lens element 170 is CT7, the following condition is satisfied: CT6/CT7=1.02.

In the optical image capturing lens assembly according to the 1st embodiment, when an axial distance between the object-side surface 111 of the first lens element 110 and the image-side surface 172 of the seventh lens element 170 is TD, the following condition is satisfied: TD=5.18 mm.

In the optical image capturing lens assembly according to the 1st embodiment, when an axial distance between the object-side surface 111 of the first lens element 110 and the image surface 190 is TL, and an entrance pupil diameter of the optical image capturing lens assembly is EPD, the following condition is satisfied: TL/EPD=2.19.

In the optical image capturing lens assembly according to the 1st embodiment, when the axial distance between the object-side surface 111 of the first lens element 110 and the image surface 190 is TL, a maximum image height of the optical image capturing lens assembly is ImgH (that is, half of a diagonal length of an effective photosensitive area of the image sensor 195), and the entrance pupil diameter of the optical image capturing lens assembly is EPD, the following conditions are satisfied: TL/ImgH=1.43; and TL×TL/(ImgH×EPD)=3.13.

In the optical image capturing lens assembly according to the 1st embodiment, when the focal length of the optical image capturing lens assembly is f, a curvature radius of the object-side surface 161 of the sixth lens element is R11, and a curvature radius of the image-side surface 162 of the sixth lens element is R12, the following condition is satisfied: f/|R11|+f/|R12|=0.90.

In the optical image capturing lens assembly according to the 1st embodiment, when the focal length of the optical image capturing lens assembly is f, a focal length of the sixth lens element 160 is f6, and a focal length of the seventh lens element 170 is f7, the following conditions are satisfied: (f/f6)+(f/f7)=−0.71; and |f/f7|=1.20.

In the optical image capturing lens assembly according to the 1st embodiment, when the focal length of the optical image capturing lens assembly is f and a focal length of the third lens element 130 is f3, the following condition is satisfied: |f3/f|=8.09.

In the optical image capturing lens assembly according to the 1st embodiment, when the focal length of the optical image capturing lens assembly is f and a focal length of the fourth lens element 140 is f4, the following condition is satisfied: |f4/f|=1.31.

In the optical image capturing lens assembly according to the 1st embodiment, when the entrance pupil diameter of the optical image capturing lens assembly is EPD and a curvature radius of the image-side surface 172 of the seventh lens element 170 is R14, the following condition is satisfied: EPD/R14=1.16.

FIG. 15 is a schematic view of critical points, a parameter Y62 and a parameter Y72 according to the 1st embodiment in FIG. 1. In FIG. 15, when a maximum effective radius of the image-side surface 162 of the sixth lens element 160 is Y62, and a maximum effective radius of the image-side surface 172 of the seventh lens element 170 is Y72, the following condition is satisfied: Y72/Y62=1.16.

The detailed optical data of the 1st embodiment are shown in Table 1 and the aspheric surface data are shown in Table 2 below.

TABLE 1

1st Embodiment
f = 4.29 mm, Fno = 1.66, HFOV = 42.2 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.469 | | | | |
| 2 | Lens 1 | 2.060 | ASP | 0.653 | Plastic | 1.545 | 56.0 | 4.03 |
| 3 | | 29.812 | ASP | 0.038 | | | | |
| 4 | Lens 2 | 9.592 | ASP | 0.200 | Plastic | 1.614 | 26.0 | −8.93 |
| 5 | | 3.460 | ASP | 0.506 | | | | |
| 6 | Lens 3 | −44.098 | ASP | 0.335 | Plastic | 1.669 | 19.5 | −34.67 |
| 7 | | 49.061 | ASP | 0.178 | | | | |
| 8 | Lens 4 | −16.387 | ASP | 0.677 | Plastic | 1.544 | 56.0 | 5.59 |
| 9 | | −2.604 | ASP | 0.065 | | | | |
| 10 | Lens 5 | 2.256 | ASP | 0.201 | Plastic | 1.584 | 28.2 | −13.21 |
| 11 | | 1.688 | ASP | 0.480 | | | | |
| 12 | Lens 6 | 7.409 | ASP | 0.485 | Plastic | 1.544 | 56.0 | 8.80 |
| 13 | | −13.227 | ASP | 0.890 | | | | |
| 14 | Lens 7 | −23.424 | ASP | 0.475 | Plastic | 1.566 | 37.4 | −3.57 |
| 15 | | 2.231 | ASP | 0.280 | | | | |
| 16 | IR-cut filter | Plano | | 0.100 | Glass | 1.517 | 64.2 | — |
| 17 | | Plano | | 0.089 | | | | |
| 18 | Image | Plano | | — | | | | |

Reference wavelength is 587.6 nm (d-line).

TABLE 2

Aspheric Coefficients

| Surface # | 2 | 3 | 4 | 5 | 6 |
|---|---|---|---|---|---|
| k = | 1.8220E−01 | −5.4202E+01 | −2.2678E+01 | −2.0102E+01 | 9.0000E+01 |
| A4 = | −1.0097E−03 | −5.2454E−02 | −9.1741E−02 | 1.4830E−02 | −7.1391E−02 |
| A6 = | 8.3411E−03 | 1.2815E−01 | 3.2400E−02 | 1.8725E−01 | −1.7700E−02 |
| A8 = | −1.1333E−02 | −1.3596E−01 | −1.7844E−01 | −2.3782E−02 | 3.2496E−02 |
| A10 = | 8.4114E−03 | 8.1635E−02 | 9.2284E−02 | 6.0830E−03 | −3.6513E−02 |
| A12 = | −2.2674E−03 | −2.6408E−02 | −2.2687E−02 | −2.2436E−03 | 1.5373E−02 |
| A14 = | | 3.4945E−03 | 2.0759E−03 | 2.7525E−03 | |

TABLE 2-continued

| Aspheric Coefficients | | | | | |
|---|---|---|---|---|---|
| Surface # | 7 | 8 | 9 | 10 | 11 |
| k = | −9.0000E+01 | 4.6704E+00 | −3.3605E+00 | −1.1722E+01 | −7.6491E+00 |
| A4 = | −6.6588E−02 | −8.1182E−04 | 4.1084E−02 | 2.4954E−02 | 1.3158E−02 |
| A6 = | 2.3424E−02 | 2.7519E−02 | −3.8095E−02 | −2.6051E−02 | −1.6829E−02 |
| A8 = | −2.8906E−02 | −4.1600E−02 | 1.4677E−02 | 6.6617E−03 | 4.0937E−03 |
| A10 = | 1.2792E−02 | 1.7891E−02 | −5.1266E−03 | −1.1727E−03 | −4.1427E−04 |
| A12 = | −4.1319E−05 | −2.3804E−03 | 8.7310E−04 | 9.9519E−05 | 1.5333E−05 |

| Surface # | 12 | 13 | 14 | 15 |
|---|---|---|---|---|
| k = | −1.8251E+01 | −1.7885E+01 | 4.3728E+01 | −8.6029E+00 |
| A4 = | 4.6589E−02 | 5.9671E−02 | −8.5522E−02 | −3.3037E−02 |
| A6 = | −3.1023E−02 | −2.9986E−02 | 1.8647E−02 | 6.9073E−03 |
| A8 = | 8.9572E−03 | 8.1869E−03 | −1.4799E−03 | −7.7320E−04 |
| A10 = | −1.5449E−03 | −1.4171E−03 | 4.1805E−05 | 2.2106E−05 |
| A12 = | 1.6413E−04 | 1.5328E−04 | | 1.7360E−06 |
| A14 = | −9.7957E−06 | −9.2732E−06 | | −8.9684E−08 |
| A16 = | 2.4881E−07 | 2.3589E−07 | | |

In Table 1, the curvature radius, the thickness and the focal length according to the 1st embodiment of FIG. 1 are shown in millimeters (mm), and surface numbers 0-18 represent the surfaces sequentially arranged from the object side to the image side along the optical axis. In Table 2, k represents the conic coefficient of the equation of the aspheric surface profiles. A4-A16 represent the aspheric coefficients of each surface ranging from the 4th order to the 16th order. The tables presented below for each embodiment correspond to schematic parameter and aberration curves, and the definitions of the tables are the same as Table 1 and Table 2 of the 1st embodiment. Therefore, an explanation in this regard will not be provided again.

Furthermore, in the optical image capturing lens assembly according to the 1st embodiment, at least one of Abbe numbers of the first lens element 110, the second lens element 120, the third lens element 130, the fourth lens element 140, the fifth lens element 150, the sixth lens element 160 and the seventh lens element 170 is smaller than 20, and at least three of the Abbe numbers are smaller than 40. In detail, in the 1st embodiment, a number of the lens elements with the Abbe number smaller than 20 is 1, that is, the third lens element 130, and a number of the lens elements with the Abbe number smaller than 40 is 4, which are, the second lens element 120, the third lens element 130, the fifth lens element 150 and the seventh lens element 170.

2nd Embodiment

Figure 3:
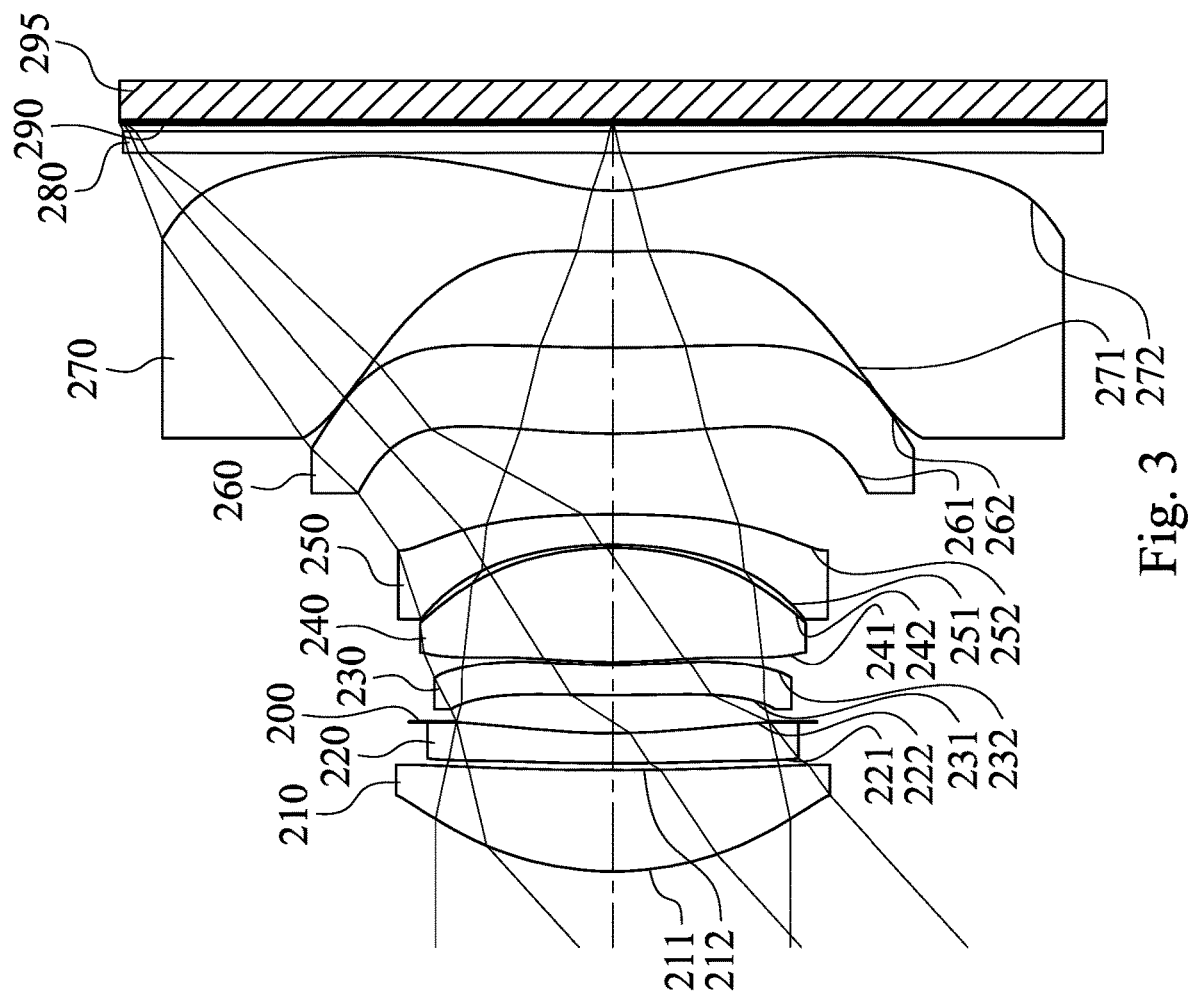
FIG. 3 is a schematic view of an imaging apparatus according to the 2nd embodiment of the present disclosure.
Figure 4:
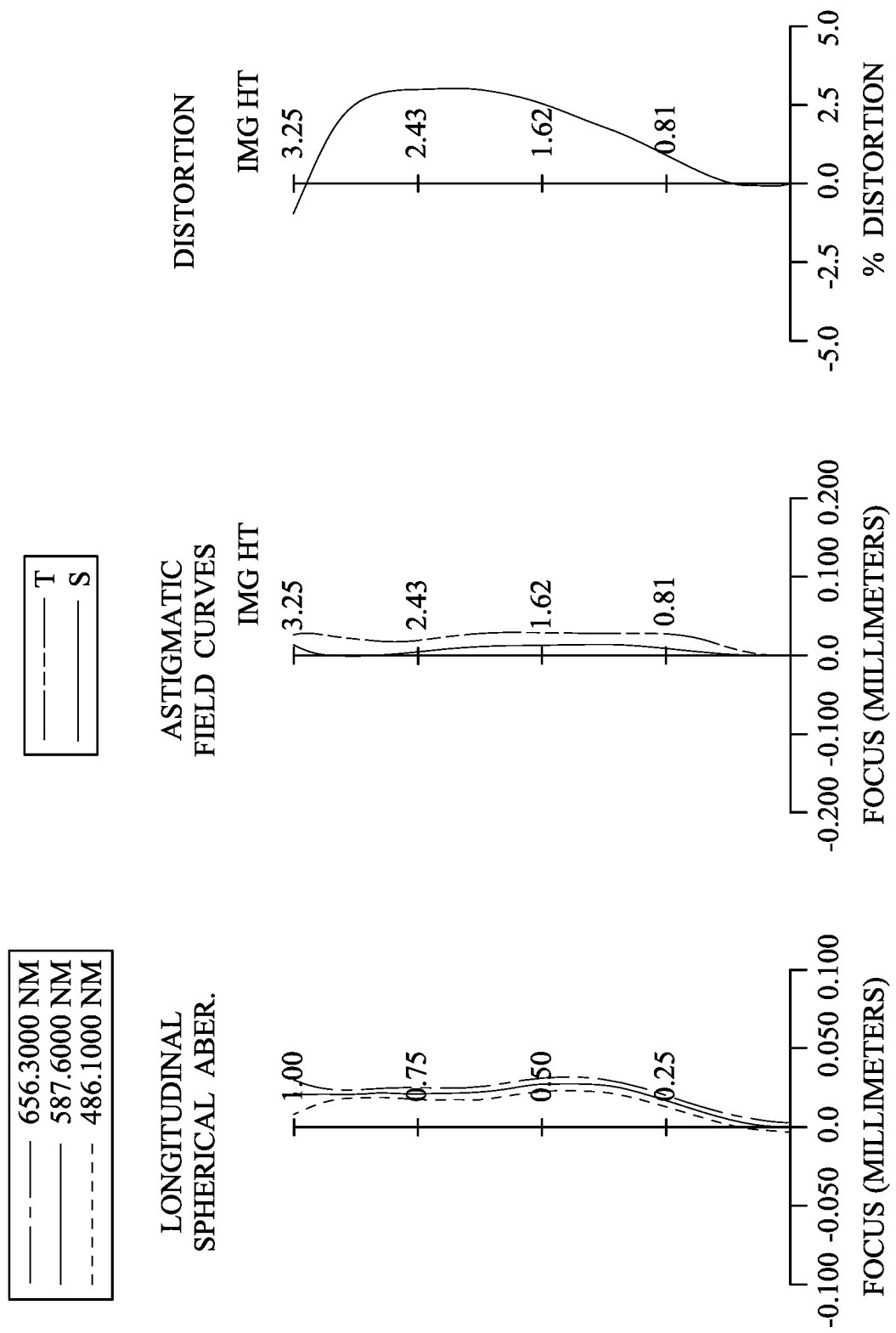
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an optical image capturing lens assembly (its reference numeral is omitted) and an image sensor 295. The optical image capturing lens assembly includes, in order from an object side to an image side, a first lens element 210, a second lens element 220, an aperture stop 200, a third lens element 230, a fourth lens element 240, a fifth lens element 250, a sixth lens element 260, a seventh lens element 270, an IR-cut filter 280 and an image surface 290. The image sensor 295 is disposed on the image surface 290 of the optical image capturing lens assembly. The optical image capturing lens assembly includes seven lens elements (210, 220, 230, 240, 250, 260 and 270) without additional one or more lens elements inserted between the first lens element 210 and the seventh lens element 270.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of a plastic material, and has the object-side surface 241 and the image-side surface 242 being both aspheric. Furthermore, the object-side surface 241 of the fourth lens element 240 includes at least one concave critical point and at least one convex critical point in an off-axis region thereof.

The fifth lens element 250 with negative refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric. Furthermore, the image-side surface 252 of the fifth lens element 250 includes at least one concave critical point in an off-axis region thereof.

The sixth lens element 260 with positive refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric.

Furthermore, the object-side surface 261 of the sixth lens element 260 includes at least one concave critical point and at least one inflection point in an off-axis region thereof, and the image-side surface 262 of the sixth lens element 260 includes at least one convex critical point in an off-axis region thereof.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Furthermore, the object-side surface 271 of the seventh lens element 270 includes at least one concave critical point in an off-axis region thereof, and the image-side surface 272 of the seventh lens element 270 includes at least one convex critical point in an off-axis region thereof.

The IR-cut filter 280 is made of a glass material and disposed between the seventh lens element 270 and the image surface 290 and will not affect the focal length of the optical image capturing lens assembly.

The detailed optical data of the 2nd embodiment are shown in Table 3 and the aspheric surface data are shown in Table 4 below.

TABLE 3

2nd Embodiment
f = 3.59 mm, Fno = 1.53, HFOV = 42.2 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Lens 1 | 2.103 | ASP | 0.671 | Plastic | 1.545 | 56.0 | 4.08 |
| 2 | | 34.372 | ASP | 0.045 | | | | |
| 3 | Lens 2 | 20.781 | ASP | 0.200 | Plastic | 1.566 | 37.4 | −11.65 |
| 4 | | 4.988 | ASP | 0.074 | | | | |
| 5 | Ape. Stop | Plano | | 0.177 | | | | |
| 6 | Lens 3 | 13.124 | ASP | 0.200 | Plastic | 1.566 | 37.4 | −10.21 |
| 7 | | 3.989 | ASP | 0.020 | | | | |
| 8 | Lens 4 | 4.009 | ASP | 0.758 | Plastic | 1.544 | 56.0 | 2.64 |
| 9 | | −2.083 | ASP | 0.020 | | | | |
| 10 | Lens 5 | −2.817 | ASP | 0.200 | Plastic | 1.669 | 19.5 | −5.81 |
| 11 | | −10.531 | ASP | 0.534 | | | | |
| 12 | Lens 6 | 4.779 | ASP | 0.573 | Plastic | 1.669 | 19.5 | 13.40 |
| 13 | | 9.744 | ASP | 0.635 | | | | |
| 14 | Lens 7 | 6.104 | ASP | 0.402 | Plastic | 1.511 | 56.8 | −3.35 |
| 15 | | 1.308 | ASP | 0.250 | | | | |
| 16 | IR-cut filter | Plano | | 0.145 | Glass | 1.517 | 64.2 | — |
| 17 | | Plano | | 0.058 | | | | |
| 18 | Image | Plano | | — | | | | |

Reference wavelength is 587.6 nm (d-line).

TABLE 4

Aspheric Coefficients

| Surface # | 1 | 2 | 3 | 4 | 6 |
|---|---|---|---|---|---|
| k = | 1.2253E−02 | 6.6012E+01 | −9.0000E+01 | 1.3621E+01 | 9.0000E+01 |
| A4 = | −6.0944E−03 | 5.9744E−02 | 5.9697E−02 | −1.4871E−02 | −8.1449E−02 |
| A6 = | 8.1172E−03 | −1.4078E−01 | −1.9671E−01 | −1.0388E−01 | −1.5438E−02 |
| A8 = | −1.0270E−02 | 1.6130E−01 | 2.4053E−01 | 1.2843E−01 | 5.0213E−02 |
| A10 = | 3.1535E−03 | −9.3677E−02 | −1.4093E−01 | −8.6605E−02 | −1.6822E−01 |
| A12 = | 1.4739E−03 | 2.3561E−02 | 3.3459E−02 | 2.3677E−02 | 1.8239E−01 |
| A14 = | −9.6012E−04 | −1.3473E−03 | | | −7.1067E−02 |

| Surface # | 7 | 8 | 9 | 10 | 11 |
|---|---|---|---|---|---|
| k = | 4.8178E+00 | 4.8981E+00 | −6.4376E+00 | 2.5016E+00 | 3.7130E+01 |
| A4 = | −2.1466E−01 | −1.7025E−01 | −7.0938E−02 | −5.1377E−02 | −9.7869E−02 |
| A6 = | 1.4036E−01 | 1.2895E−01 | −6.5841E−02 | 1.9118E−02 | 9.9784E−02 |
| A8 = | −2.2614E−01 | −2.2693E−01 | 1.0749E−01 | −1.2051E−02 | −1.0171E−01 |
| A10 = | 2.3044E−01 | 2.8277E−01 | −9.1960E−02 | −4.7799E−03 | 6.6455E−02 |
| A12 = | −9.1030E−02 | −1.5057E−01 | 4.0404E−02 | 8.0778E−03 | −2.5242E−02 |
| A14 = | 5.2423E−03 | 2.9123E−02 | −6.4440E−03 | −2.6990E−03 | 4.6341E−03 |

| Surface # | 12 | 13 | 14 | 15 |
|---|---|---|---|---|
| k = | −7.3247E+00 | 2.1181E+01 | −5.1656E+01 | −8.2019E+00 |
| A4 = | −5.9943E−02 | −5.0114E−02 | −3.6445E−01 | −8.2101E−02 |
| A6 = | 4.4961E−02 | 3.8914E−02 | 2.2743E−01 | 3.7005E−02 |
| A8 = | −5.9310E−02 | −4.4737E−02 | −1.0180E−01 | −9.8597E−03 |
| A10 = | 3.5106E−02 | 2.3459E−02 | 2.5770E−02 | 1.4125E−03 |

TABLE 4-continued

| | Aspheric Coefficients | | | |
|---|---|---|---|---|
| A12 = | −1.1108E−02 | −7.1251E−03 | −2.9823E−03 | −9.3561E−05 |
| A14 = | 1.3465E−03 | 1.1421E−03 | 8.6364E−05 | 1.2027E−06 |
| A16 = | | −7.3225E−05 | 5.4443E−06 | 8.4299E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.59 | TL × TL/(ImgH × EPD) | 3.24 |
| Fno | 1.53 | f/|R11| + f/|R12| | 1.12 |
| HFOV [deg.] | 42.2 | (f/f6) + (f/f7) | −0.80 |
| Nmax | 1.669 | |f/f7| | 1.07 |
| (V3 + V4)/|V3 − V4| | 5.04 | |f3/f| | 2.84 |
| CT6/CT7 | 1.43 | |f4/f| | 0.73 |
| TD [mm] | 4.51 | EPD/R14 | 1.79 |
| TL/EPD | 2.12 | Y72/Y62 | 1.50 |
| TL/ImgH | 1.53 | | |

Furthermore, in the optical image capturing lens assembly according to the 2nd embodiment, at least one of Abbe numbers of the first lens element 210, the second lens element 220, the third lens element 230, the fourth lens element 240, the fifth lens element 250, the sixth lens element 260 and the seventh lens element 270 is smaller than 20, and at least three of the Abbe numbers are smaller than 40. In detail, in the 2nd embodiment, a number of the lens elements with the Abbe number smaller than 20 is 2, which are, the fifth lens element 250 and the sixth lens element 260, and a number of the lens elements with the Abbe number smaller than 40 is 4, which are, the second lens element 220, the third lens element 230, the fifth lens element 250 and the sixth lens element 260.

3rd Embodiment

Figure 5:
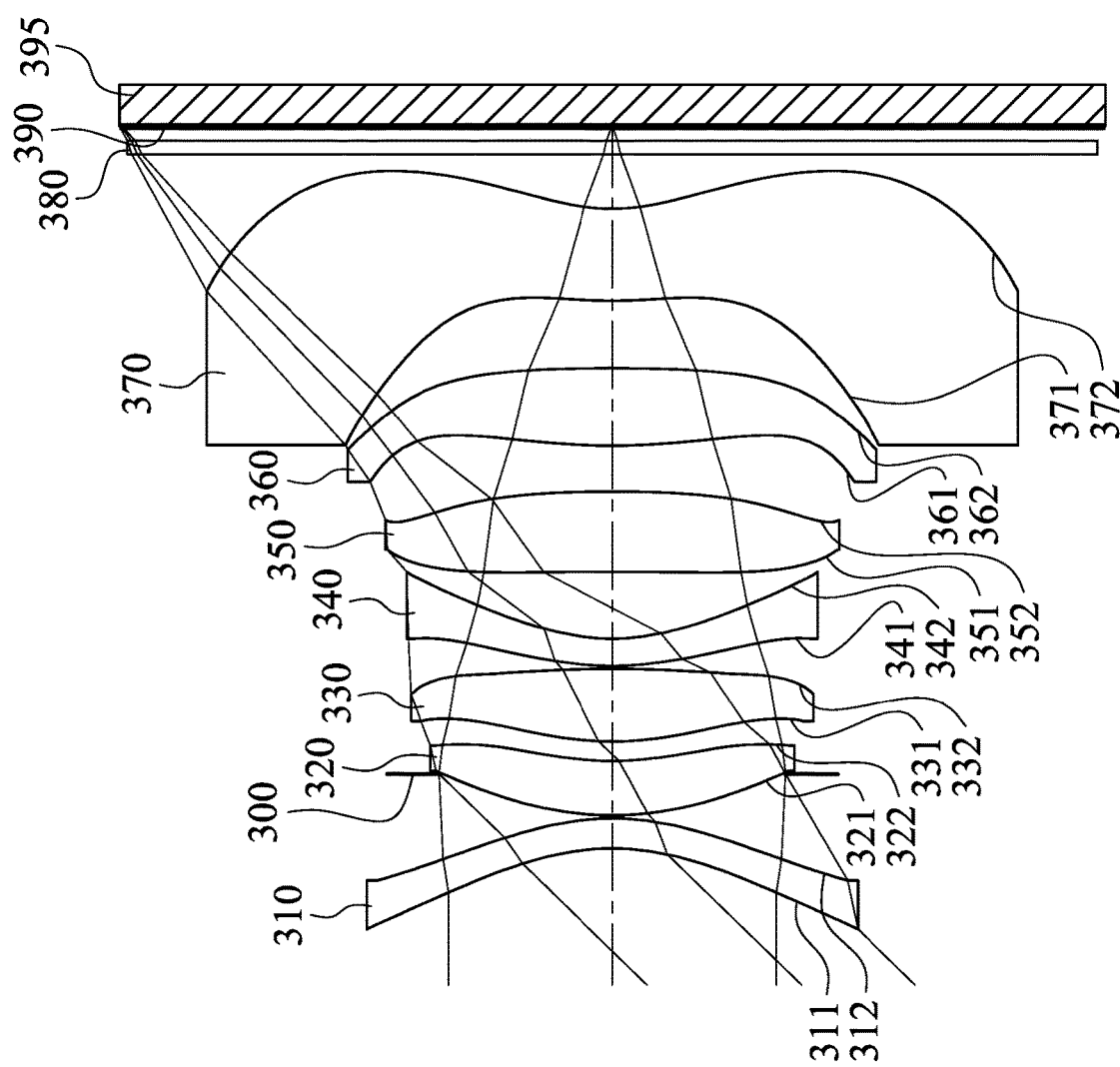
FIG. 5 is a schematic view of an imaging apparatus according to the 3rd embodiment of the present disclosure.
Figure 6:
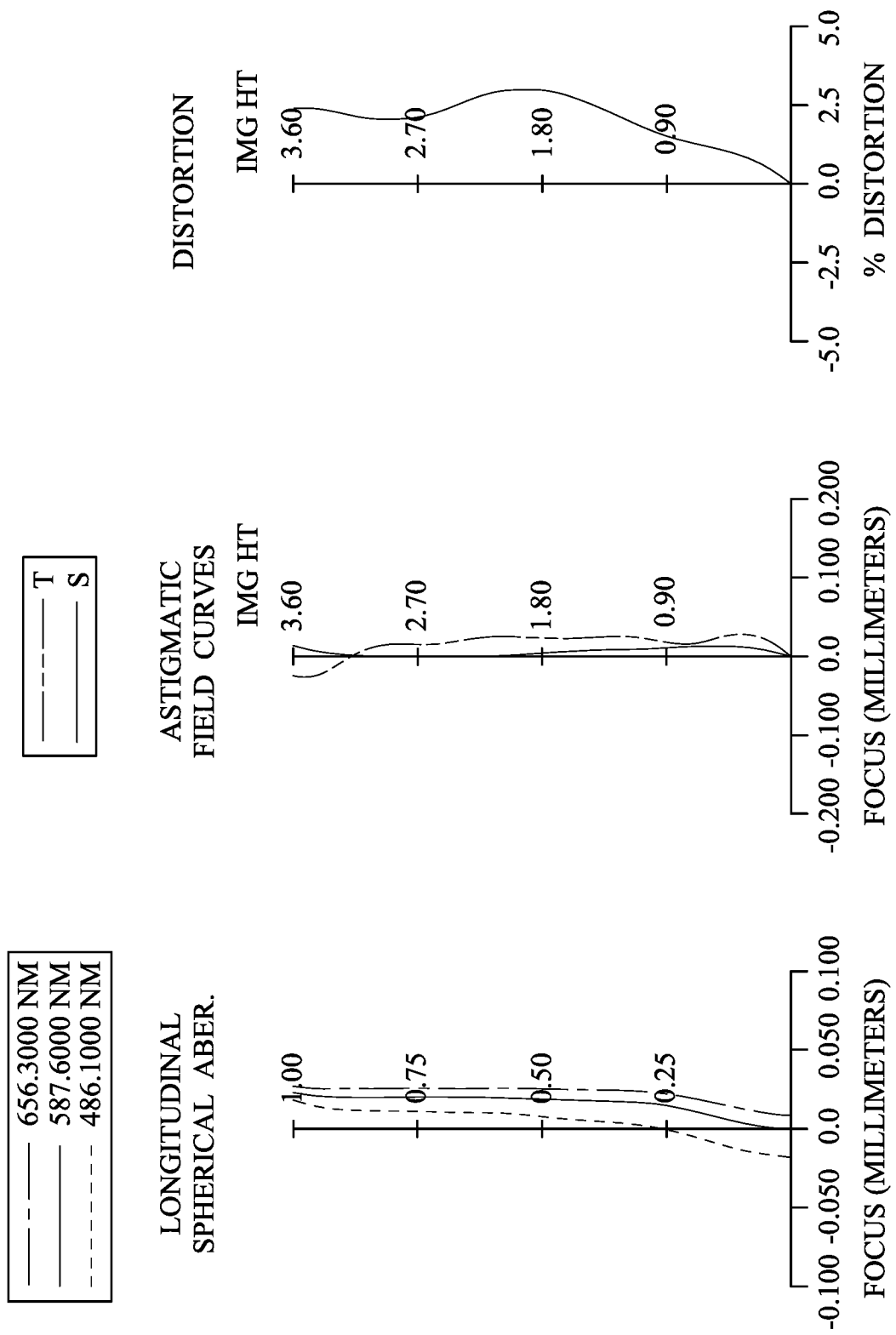
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an optical image capturing lens assembly (its reference numeral is omitted) and an image sensor 395. The optical image capturing lens assembly includes, in order from an object side to an image side, a first lens element 310, an aperture stop 300, a second lens element 320, a third lens element 330, a fourth lens element 340, a fifth lens element 350, a sixth lens element 360, a seventh lens element 370, an IR-cut filter 380 and an image surface 390. The image sensor 395 is disposed on the image surface 390 of the optical image capturing lens assembly. The optical image capturing lens assembly includes seven lens elements (310, 320, 330, 340, 350, 360 and 370) without additional one or more lens elements inserted between the first lens element 310 and the seventh lens element 370.

The first lens element 310 with positive refractive power has an object-side surface 311 being concave in a paraxial region thereof and an image-side surface 312 being convex in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, the object-side surface 341 of the fourth lens element 340 includes at least one concave critical point and at least one convex critical point in an off-axis region thereof.

The fifth lens element 350 with positive refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric. Furthermore, the object-side surface 351 of the fifth lens element 350 includes at least one convex critical point in an off-axis region thereof, and the image-side surface 352 of the fifth lens element 350 includes at least one concave critical point in an off-axis region thereof.

The sixth lens element 360 with positive refractive power has an object-side surface 361 being convex in a paraxial region thereof and an image-side surface 362 being convex in a paraxial region thereof. The sixth lens element 360 is made of a plastic material, and has the object-side surface 361 and the image-side surface 362 being both aspheric. Furthermore, the object-side surface 361 of the sixth lens element 360 includes at least one concave critical point and at least one inflection point in an off-axis region thereof.

The seventh lens element 370 with negative refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric. Furthermore, the object-side surface 371 of the seventh lens element 370 includes at least one concave critical point in an off-axis region thereof, and the image-side surface 372 of the seventh lens element 370 includes at least one convex critical point in an off-axis region thereof.

The IR-cut filter 380 is made of a glass material and disposed between the seventh lens element 370 and the image surface 390 and will not affect the focal length of the optical image capturing lens assembly.

The detailed optical data of the 3rd embodiment are shown in Table 5 and the aspheric surface data are shown in Table 6 below.

TABLE 5

3rd embodiment
f = 3.41 mm, Fno = 1.42, HFOV = 45.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.823 | ASP | 0.221 | Plastic | 1.582 | 30.2 | 90.50 |
| 2 | | −1.840 | ASP | 0.323 | | | | |
| 3 | Ape. Stop | Plano | | −0.302 | | | | |
| 4 | Lens 2 | 2.354 | ASP | 0.397 | Plastic | 1.544 | 56.0 | −136.10 |
| 5 | | 2.146 | ASP | 0.144 | | | | |
| 6 | Lens 3 | 2.339 | ASP | 0.537 | Plastic | 1.544 | 56.0 | 3.36 |
| 7 | | −7.738 | ASP | 0.020 | | | | |
| 8 | Lens 4 | 2.277 | ASP | 0.200 | Plastic | 1.669 | 19.5 | −8.84 |
| 9 | | 1.586 | ASP | 0.489 | | | | |
| 10 | Lens 5 | −34.032 | ASP | 0.588 | Plastic | 1.544 | 56.0 | 32.35 |
| 11 | | −11.670 | ASP | 0.337 | | | | |
| 12 | Lens 6 | 5.072 | ASP | 0.571 | Plastic | 1.544 | 56.0 | 7.19 |
| 13 | | −16.390 | ASP | 0.494 | | | | |
| 14 | Lens 7 | 3.227 | ASP | 0.672 | Plastic | 1.582 | 30.2 | −4.80 |
| 15 | | 1.383 | ASP | 0.400 | | | | |
| 16 | IR-cut filter | Plano | | 0.100 | Glass | 1.517 | 64.2 | — |
| 17 | | Plano | | 0.105 | | | | |
| 18 | Image | Plano | | — | | | | |

Reference wavelength is 587.6 nm (d-line).

TABLE 6

Aspheric Coefficients

| Surface # | 1 | 2 | 4 | 5 | 6 |
|---|---|---|---|---|---|
| k = | −4.1012E+00 | −7.6802E+00 | −1.0687E+00 | −4.0056E+00 | −6.4956E+00 |
| A4 = | −2.2966E−02 | −4.1464E−02 | −2.0323E−02 | −1.4495E−01 | −1.2729E−02 |
| A6 = | 2.0502E−02 | 3.7417E−02 | 4.0400E−02 | 1.8111E−01 | 6.0954E−03 |
| A8 = | −6.8551E−03 | −1.5471E−02 | −6.0118E−02 | −2.3728E−01 | −3.7368E−02 |
| A10 = | 8.6722E−04 | 3.7586E−03 | 5.1248E−02 | 1.7371E−01 | 1.2548E−02 |
| A12 = | 2.4318E−05 | −5.4801E−04 | −2.4911E−02 | −6.7407E−02 | 6.0994E−03 |
| A14 = | −1.0443E−05 | 4.2358E−05 | 5.0571E−03 | 1.1254E−02 | −2.8199E−03 |

| Surface # | 7 | 8 | 9 | 10 | 11 |
|---|---|---|---|---|---|
| k = | 1.8820E+01 | −8.2639E+00 | −3.6801E+00 | 8.7649E+01 | 3.4817E+01 |
| A4 = | 3.7430E−02 | −2.9164E−02 | −3.0979E−02 | 9.3608E−03 | −3.7922E−02 |
| A6 = | −7.2290E−03 | 1.4799E−02 | 3.7837E−02 | 1.0807E−03 | 7.8793E−03 |
| A8 = | −4.0623E−03 | −6.7544E−03 | −2.2372E−02 | 1.2480E−02 | −3.0131E−03 |
| A10 = | 4.7461E−03 | 7.9952E−03 | 7.8508E−03 | −1.3143E−02 | 4.2216E−03 |
| A12 = | −2.9366E−03 | −7.6395E−03 | −2.5510E−03 | 6.7591E−03 | −2.3337E−03 |
| A14 = | 2.6290E−04 | 1.9084E−03 | 5.6105E−04 | −1.6915E−03 | 4.9050E−04 |
| A16 = | | | | 1.7129E−04 | |

| Surface # | 12 | 13 | 14 | 15 |
|---|---|---|---|---|
| k = | −9.7133E+00 | −8.7465E+01 | −7.7925E+01 | −6.2170E+00 |
| A4 = | −1.3893E−02 | −5.0377E−02 | −1.1369E−01 | −5.8482E−02 |
| A6 = | −6.1056E−03 | 5.0865E−02 | −4.7749E−02 | 1.8221E−02 |
| A8 = | 1.0030E−03 | −4.8413E−02 | 6.7972E−02 | −4.0404E−03 |
| A10 = | −4.9218E−03 | 2.3942E−02 | −4.0596E−02 | 4.8183E−04 |
| A12 = | 3.3625E−03 | −7.4653E−03 | 1.3454E−02 | −2.8528E−05 |
| A14 = | −1.0511E−03 | 1.3693E−03 | −2.2798E−03 | 6.1492E−07 |
| A16 = | 1.2200E−04 | −1.0698E−04 | 1.5163E−04 | |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd embodiment | | | |
|---|---|---|---|
| f [mm] | 3.41 | TL × TL/(ImgH × EPD) | 3.24 |
| Fno | 1.42 | f/|R11| + f/|R12] | 0.88 |
| HFOV [deg.] | 45.7 | (f/f6) + (f/f7) | −0.24 |
| Nmax | 1.669 | |f/f7| | 0.71 |
| (V3 + V4)/|V3 − V4| | 2.06 | |f3/f| | 0.99 |
| CT6/CT7 | 0.85 | |f4/f| | 2.59 |
| TD [mm] | 4.69 | EPD/R14 | 1.74 |
| TL/EPD | 2.20 | Y72/Y62 | 1.54 |
| TL/ImgH | 1.47 | | |

Furthermore, in the optical image capturing lens assembly according to the 3rd embodiment, at least one of Abbe numbers of the first lens element 310, the second lens element 320, the third lens element 330, the fourth lens element 340, the fifth lens element 350, the sixth lens element 360 and the seventh lens element 370 is smaller than 20, and at least three of the Abbe numbers are smaller than 40. In detail, in the 3rd embodiment, a number of the lens elements with the Abbe number smaller than 20 is 1, that is, the fourth lens element 340, and a number of the lens elements with the Abbe number smaller than 40 is 3, which are, the first lens element 310, the fourth lens element 340 and the seventh lens element 370.

4th Embodiment

Figure 7:
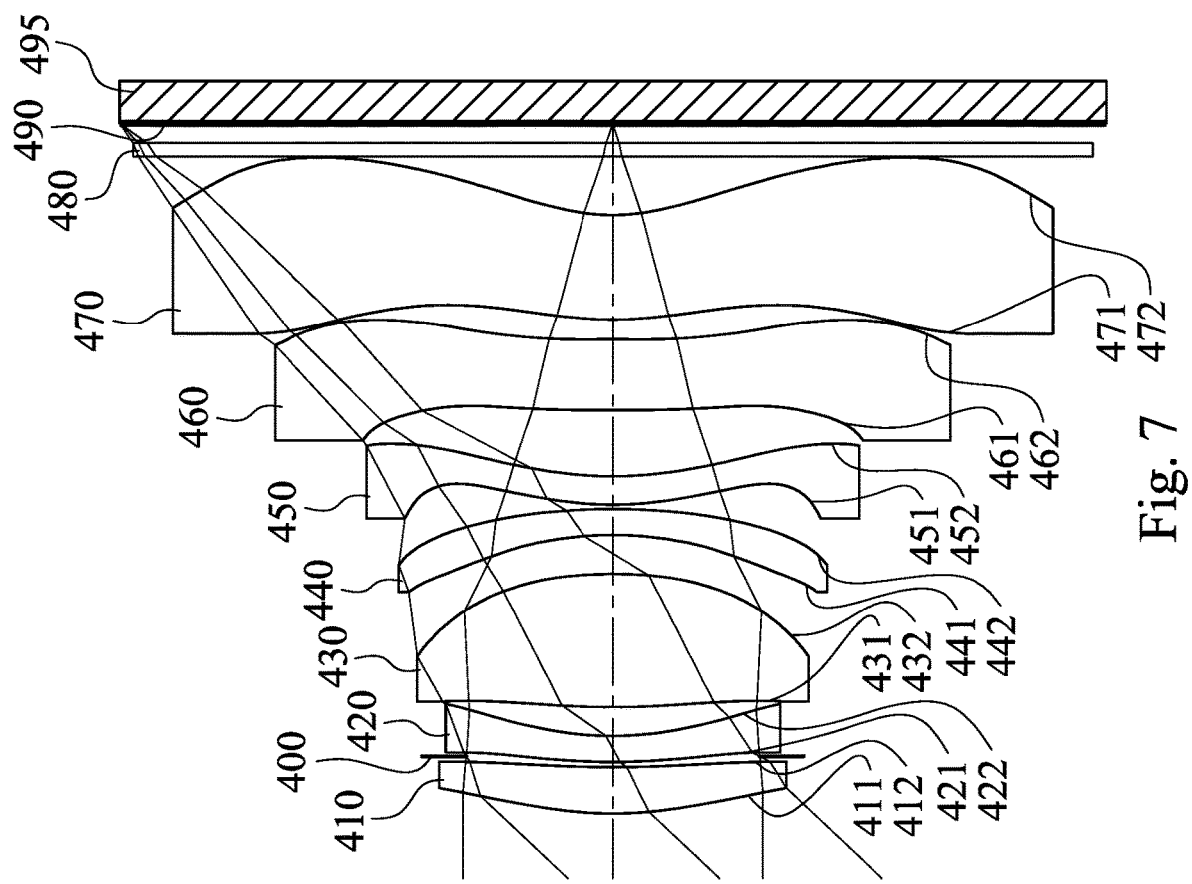
FIG. 7 is a schematic view of an imaging apparatus according to the 4th embodiment of the present disclosure.
Figure 8:
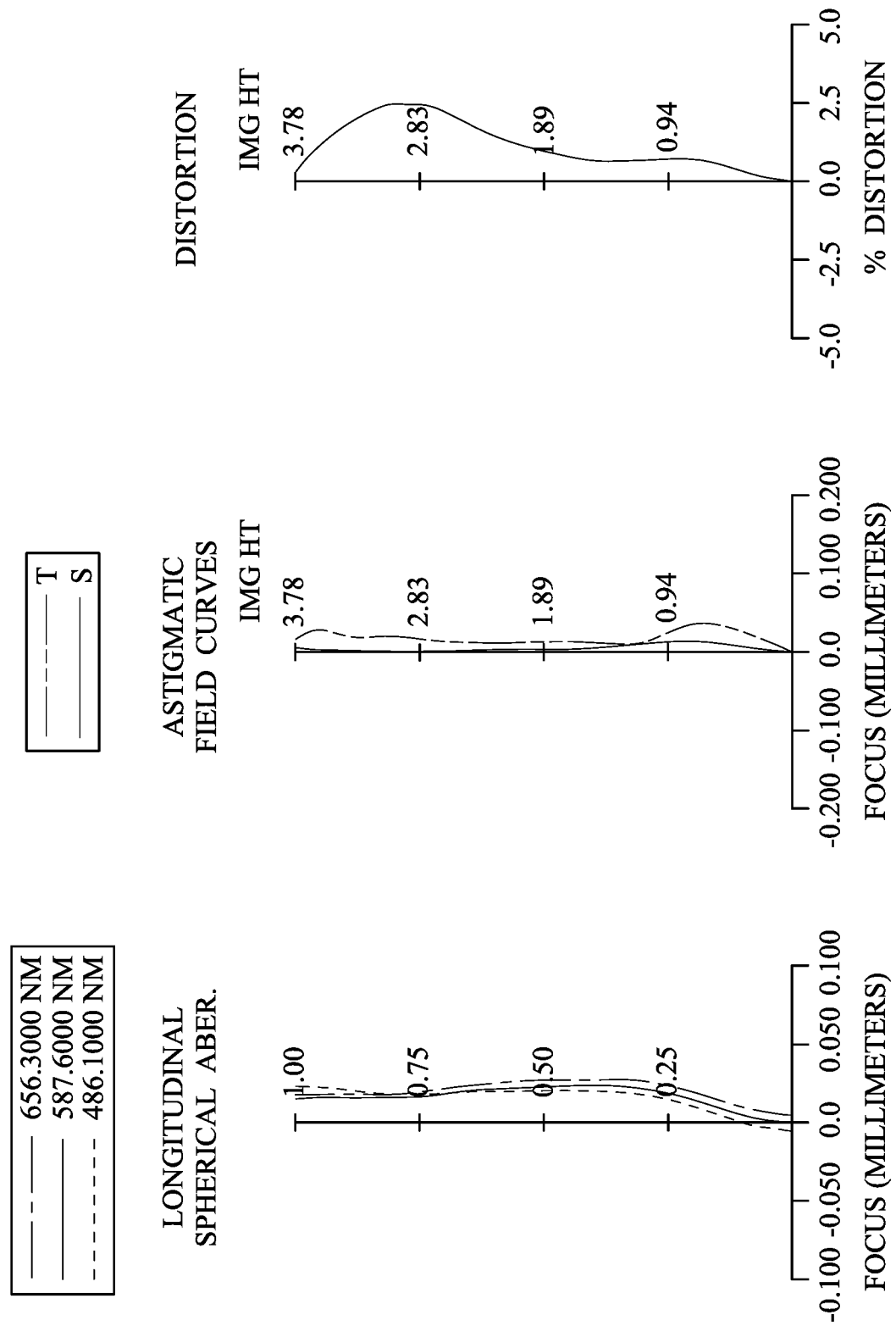
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an optical image capturing lens assembly (its reference numeral is omitted) and an image sensor 495. The optical image capturing lens assembly includes, in order from an object side to an image side, a first lens element 410, an aperture stop 400, a second lens element 420, a third lens element 430, a fourth lens element 440, a fifth lens element 450, a sixth lens element 460, a seventh lens element 470, an IR-cut filter 480 and an image surface 490. The image sensor 495 is disposed on the image surface 490 of the optical image capturing lens assembly. The optical image capturing lens assembly includes seven lens elements (410, 420, 430, 440, 450, 460 and 470) without additional one or more lens elements inserted between the first lens element 410 and the seventh lens element 470.

The first lens element 410 with positive refractive power has an object-side surface 411 being convex in a paraxial region thereof and an image-side surface 412 being concave in a paraxial region thereof. The first lens element 410 is made of a glass material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a glass material, and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with positive refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, the object-side surface 451 of the fifth lens element 450 includes at least one concave critical point in an off-axis region thereof, and the image-side surface 452 of the fifth lens element 450 includes at least one convex critical point in an off-axis region thereof.

The sixth lens element 460 has an object-side surface 461 being planar in a paraxial region thereof and an image-side surface 462 being planar in a paraxial region thereof. The sixth lens element 460 is made of a plastic material, and has the object-side surface 461 and the image-side surface 462 being both aspheric. Furthermore, the object-side surface 461 of the sixth lens element 460 includes at least one concave critical point and at least one inflection point in an off-axis region thereof, and the image-side surface 462 of the sixth lens element 460 includes at least one convex critical point off-axis region thereof.

The seventh lens element 470 with negative refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Furthermore, the object-side surface 471 of the seventh lens element 470 includes at least one concave critical point in an off-axis region, and the image-side surface 472 of the seventh lens element 470 includes at least one convex critical point in an off-axis region thereof.

The IR-cut filter 480 is made of a glass material and disposed between the seventh lens element 470 and the image surface 490 and will not affect the focal length of the optical image capturing lens assembly.

The detailed optical data of the 4th embodiment are shown in Table 7 and the aspheric surface data are shown in Table 8 below.

TABLE 7

4th Embodiment
f = 3.54 mm, Fno = 1.54, HFOV = 46.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.239 | ASP | 0.355 | Glass | 1.810 | 40.9 | 6.12 |
| 2 | | 8.897 | ASP | 0.083 | | | | |
| 3 | Ape. Stop | Plano | | −0.044 | | | | |
| 4 | Lens 2 | 4.861 | ASP | 0.200 | Plastic | 1.669 | 19.5 | −7.73 |
| 5 | | 2.464 | ASP | 0.222 | | | | |
| 6 | Lens 3 | 6.673 | ASP | 1.025 | Glass | 1.694 | 56.3 | 3.40 |
| 7 | | −3.413 | ASP | 0.299 | | | | |
| 8 | Lens 4 | −2.939 | ASP | 0.200 | Plastic | 1.614 | 26.0 | −12.55 |
| 9 | | −4.874 | ASP | 0.033 | | | | |
| 10 | Lens 5 | 2.825 | ASP | 0.219 | Plastic | 1.582 | 30.2 | 27.76 |
| 11 | | 3.325 | ASP | 0.508 | | | | |
| 12 | Lens 6 | ∞ | ASP | 0.542 | Plastic | 1.544 | 56.0 | ∞ |
| 13 | | ∞ | ASP | 0.153 | | | | |
| 14 | Lens 7 | 2.785 | ASP | 0.805 | Plastic | 1.511 | 56.8 | −9.35 |
| 15 | | 1.587 | ASP | 0.450 | | | | |
| 16 | IR-cut filter | Plano | | 0.100 | Glass | 1.517 | 64.2 | — |
| 17 | | Plano | | 0.152 | | | | |
| 18 | Image | Plano | | — | | | | |

Reference wavelength is 587.6 nm (d-line).

TABLE 8

Aspheric Coefficients

| Surface # | 1 | 2 | 4 | 5 | 6 |
|---|---|---|---|---|---|
| k = | −1.6627E+00 | −4.4508E+01 | −9.0000E+01 | −5.8753E+00 | −9.0000E+01 |
| A4 = | −1.3028E−02 | −1.3730E−02 | 2.8662E−02 | −1.6069E−02 | 1.5106E−02 |
| A6 = | −7.8175E−04 | 5.3831E−02 | 9.6071E−03 | 5.8310E−02 | −3.7387E−02 |
| A8 = | −1.5728E−02 | −1.3673E−01 | −9.3170E−02 | −8.6054E−02 | 3.4617E−02 |
| A10 = | 9.9294E−03 | 1.3055E−01 | 9.6671E−02 | 6.4309E−02 | −3.2419E−02 |
| A12 = | −2.5309E−03 | −5.8312E−02 | −4.2207E−02 | −2.6232E−02 | 1.6724E−02 |
| A14 = | 6.1144E−04 | 1.0862E−02 | 5.6544E−03 | 4.3294E−03 | −3.2013E−03 |

| Surface # | 7 | 8 | 9 | 10 | 11 |
|---|---|---|---|---|---|
| k = | −2.7674E+01 | 1.1853E−01 | −9.0000E+01 | −1.3113E+00 | −1.3330E+01 |
| A4 = | −1.4675E−01 | −1.1085E−02 | −5.0487E−02 | −1.5792E−02 | 4.4684E−02 |
| A6 = | 8.4298E−02 | −6.9238E−02 | −2.2610E−02 | −2.5501E−02 | −3.1130E−02 |
| A8 = | −6.9479E−02 | 1.2845E−01 | 5.9691E−02 | 1.1276E−02 | 4.0257E−03 |
| A10 = | 5.0450E−02 | −8.5423E−02 | −4.0769E−02 | −7.9622E−03 | 1.1396E−03 |
| A12 = | −2.6186E−02 | 2.7277E−02 | 1.2174E−02 | 2.8014E−03 | −3.2914E−04 |
| A14 = | 7.7148E−03 | −3.5568E−03 | −1.4616E−03 | −5.9061E−04 | 1.5261E−05 |
| A16 = | −9.8177E−04 | | | | |

| Surface # | 12 | 13 | 14 | 15 |
|---|---|---|---|---|
| k = | 0.0000E+00 | 0.0000E+00 | −2.9829E+00 | −9.5069E−01 |
| A4 = | 9.8207E−02 | 1.1834E−01 | −9.0891E−02 | −1.3053E−01 |
| A6 = | −1.0136E−01 | −8.3122E−02 | 2.4941E−02 | 4.2361E−02 |
| A8 = | 4.2245E−02 | 2.9908E−02 | −3.0942E−03 | −1.0206E−02 |
| A10 = | −1.1576E−02 | −6.7021E−03 | −2.2239E−04 | 1.6059E−03 |
| A12 = | 2.2289E−03 | 9.3468E−04 | 1.2027E−04 | −1.5418E−04 |
| A14 = | −2.0047E−04 | −7.4862E−05 | −1.3285E−05 | 8.0701E−06 |
| A16 = | −4.4847E−06 | 2.6317E−06 | 4.8750E−07 | −1.7490E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th embodiment | | | |
|---|---|---|---|
| f [mm] | 3.54 | TL × TL/(ImgH × EPD) | 3.23 |
| Fno | 1.54 | f/|R11| + f/|R12| | 0.00 |
| HFOV [deg.] | 46.6 | (f/f6) + (f/f7) | −0.38 |
| Nmax | 1.810 | |f/f7| | 0.38 |
| (V3 + V4)/|V3 − V4| | 2.71 | |f3/f| | 0.96 |
| CT6/CT7 | 0.67 | |f4/f| | 3.54 |
| TD [mm] | 4.60 | EPD/R14 | 1.45 |
| TL/EPD | 2.30 | Y72/Y62 | 1.30 |
| TL/ImgH | 1.40 | | |

Furthermore, in the optical image capturing lens assembly according to the 4th embodiment, at least one of an Abbe number of the first lens element 410, the second lens element 420, the third lens element 430, the fourth lens element 440, the fifth lens element 450, the sixth lens element 460 and the seventh lens element 470 is smaller than 20, and at least three of the Abbe numbers are smaller than 40. In detail, in the 4th embodiment, a number of the lens elements which the Abbe number smaller than 20 is 1, that is, the second lens element 420, and a number of the lens elements which the Abbe number smaller than 40 is 3, which are, the second lens element 420, the fourth lens element 440 and the fifth lens element 450.

5th Embodiment

Figure 9:
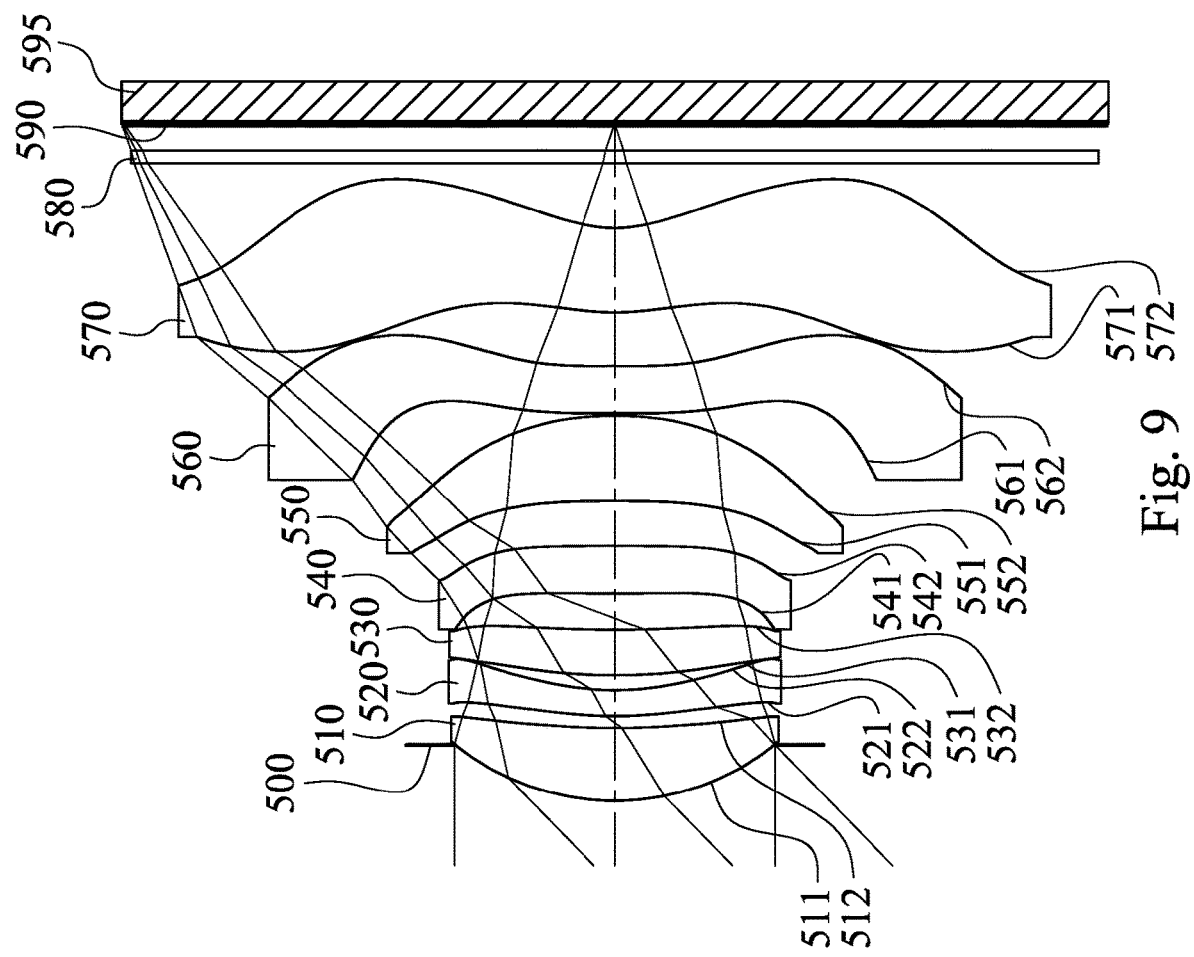
FIG. 9 is a schematic view of an imaging apparatus according to the 5th embodiment of the present disclosure.
Figure 10:
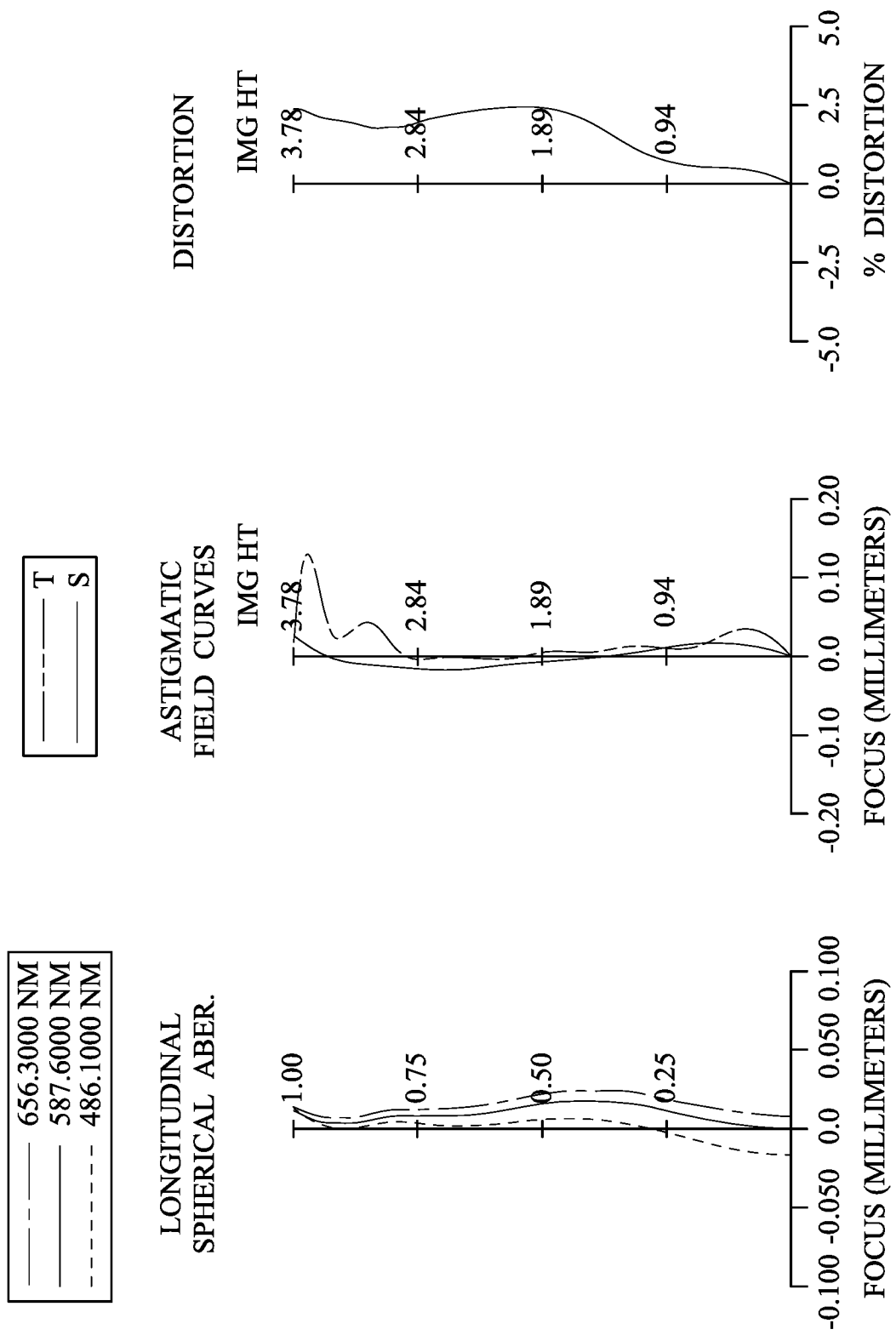
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an optical image capturing lens assembly (its reference numeral is omitted) and an image sensor 595. The optical image capturing lens assembly includes, in order from an object side to an image side, an aperture stop 500, a first lens element 510, a second lens element 520, a third lens element 530, a fourth lens element 540, a fifth lens element 550, a sixth lens element 560, a seventh lens element 570, an IR-cut filter 580 and an image surface 590. The image sensor 595 is disposed on the image surface 590 of the optical image capturing lens assembly. The optical image capturing lens assembly includes seven lens elements (510, 520, 530, 540, 550, 560 and 570) without additional one or more lens elements inserted between the first lens element 510 and the seventh lens element 570.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with positive refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, the object-side surface 541 of the fourth lens element 540 includes at least one concave critical point in an off-axis region thereof, and the image-side surface 542 of the fourth lens element 540 includes at least one convex critical point in an off-axis region thereof.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of a plastic material, and has the object-side surface 561 and the image-side surface 562 being both aspheric. Furthermore, the object-side surface 561 of the sixth lens element 560 includes at least one concave critical point, at least one convex critical point and at least one inflection point in an off-axis region thereof, and the image-side surface 562 of the sixth lens element 560 includes at least one convex critical point in an off-axis region thereof.

The seventh lens element 570 with negative refractive power has an object-side surface 571 being convex on a paraxial region thereof and an image-side surface 572 being concave in a paraxial region thereof. The seventh lens element 570 is made of a plastic material, and has the object-side surface 571 and the image-side surface 572 being both aspheric. Furthermore, the object-side surface 571 of the seventh lens element 570 includes at least one concave critical point and at least one convex critical point in an off-axis region thereof, and the image-side surface 572 of the seventh lens element 570 includes at least one convex critical point in an off-axis region thereof.

The IR-cut filter 580 is made of a glass material and disposed between the seventh lens element 570 and the image surface 590 and will not affect the focal length of the optical image capturing lens assembly.

The detailed optical data of the 5th embodiment are shown in Table 9 and the aspheric surface data are shown in Table 10 below.

TABLE 9

5th Embodiment
f = 3.79 mm, Fno = 1.54, HFOV = 44.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.428 | | | | |
| 2 | Lens 1 | 2.012 | ASP | 0.559 | Plastic | 1.545 | 56.0 | 5.33 |
| 3 | | 5.903 | ASP | 0.092 | | | | |
| 4 | Lens 2 | 3.092 | ASP | 0.200 | Plastic | 1.669 | 19.5 | −11.58 |
| 5 | | 2.153 | ASP | 0.114 | | | | |
| 6 | Lens 3 | 4.389 | ASP | 0.348 | Plastic | 1.544 | 56.0 | 15.74 |
| 7 | | 8.756 | ASP | 0.279 | | | | |
| 8 | Lens 4 | 17.034 | ASP | 0.365 | Plastic | 1.582 | 30.2 | 31.83 |
| 9 | | 208.333 | ASP | 0.345 | | | | |
| 10 | Lens 5 | −33.412 | ASP | 0.659 | Plastic | 1.544 | 56.0 | 6.09 |
| 11 | | −3.035 | ASP | 0.020 | | | | |
| 12 | Lens 6 | −60.149 | ASP | 0.361 | Plastic | 1.650 | 21.8 | −63.55 |
| 13 | | 131.932 | ASP | 0.412 | | | | |
| 14 | Lens 7 | 1.954 | ASP | 0.647 | Plastic | 1.511 | 56.8 | −5.16 |
| 15 | | 0.996 | ASP | 0.500 | | | | |
| 16 | IR-cut filter | Plano | | 0.100 | Glass | 1.517 | 64.2 | — |
| 17 | | Plano | | 0.204 | | | | |
| 18 | Image | Plano | | — | | | | |

Reference wavelength is 587.6 nm (d-line).
Effective radius of Surface 11 is 1.748 mm.

TABLE 10

| Aspheric Coefficients | | | | | |
|---|---|---|---|---|---|
| Surface # | 2 | 3 | 4 | 5 | 6 |
| k = | 5.6472E−01 | −1.0000E+00 | −2.0708E+00 | −4.2419E+00 | −1.6794E+01 |
| A4 = | −4.8312E−03 | −5.1264E−02 | −1.3156E−01 | −5.8711E−02 | −2.8566E−04 |
| A6 = | −8.9066E−03 | 9.4654E−02 | 1.8971E−01 | 1.3958E−01 | 3.3917E−02 |
| A8 = | 2.4722E−02 | −1.1897E−01 | −2.4540E−01 | −1.7467E−01 | −3.2367E−02 |
| A10 = | −3.5333E−02 | 7.8883E−02 | 1.8609E−01 | 1.0938E−01 | −9.2926E−03 |
| A12 = | 2.2075E−02 | −2.0606E−02 | −6.5991E−02 | −2.4909E−02 | 1.4071E−02 |
| A14 = | −5.2100E−03 | −2.4066E−04 | 6.2051E−03 | −2.9411E−03 | −2.6882E−03 |

| Surface # | 7 | 8 | 9 | 10 | 11 |
|---|---|---|---|---|---|
| k = | −8.9572E+01 | −8.9997E+01 | 1.0000E+00 | −2.8873E+01 | 1.3018E+00 |
| A4 = | −5.9749E−03 | −7.1001E−02 | −9.6551E−02 | −1.7924E−01 | −2.0679E−01 |
| A6 = | −3.6078E−03 | 2.3049E−02 | 8.9896E−02 | 1.8049E−01 | 3.3083E−01 |
| A8 = | −1.3050E−03 | −5.8141E−02 | −1.2175E−01 | −1.0717E−01 | −3.3228E−01 |
| A10 = | −2.5493E−03 | −2.5785E−02 | 4.2544E−02 | 4.8041E−03 | 2.0436E−01 |
| A12 = | −5.1129E−03 | 1.0089E−01 | 2.5822E−02 | 1.6243E−02 | −7.7584E−02 |
| A14 = | 2.2315E−03 | −8.7023E−02 | −2.8847E−02 | −3.8149E−03 | 1.6891E−02 |
| A16 = | | 2.3293E−02 | 7.9978E−03 | | −1.5817E−03 |

| Surface # | 12 | 13 | 14 | 15 |
|---|---|---|---|---|
| k = | −9.0000E+01 | 1.8346E+00 | −2.3078E+01 | −5.3018E+00 |
| A4 = | 1.6766E−01 | 2.5183E−01 | −9.4609E−02 | −5.5186E−02 |
| A6 = | −1.0099E−01 | −2.0190E−01 | 1.9454E−02 | 1.9001E−02 |
| A8 = | 1.4354E−03 | 7.9598E−02 | −5.7842E−04 | −5.1510E−03 |
| A10 = | 1.3576E−02 | −1.8715E−02 | −2.6111E−04 | 7.4476E−04 |
| A12 = | −4.3698E−03 | 2.6065E−03 | 3.7398E−05 | −5.7074E−05 |
| A14 = | 4.2437E−04 | −1.9773E−04 | −2.0357E−06 | 2.2836E−06 |
| A16 = | | 6.2890E−06 | 4.0654E−08 | −3.8943E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th embodiment | | | |
|---|---|---|---|
| f [mm] | 3.79 | TL*TL/(ImgH × EPD) | 2.91 |
| Fno | 1.54 | f/|R11| + f/|R12| | 0.09 |
| HFOV [deg.] | 44.2 | (f/f6) + (f/f7) | −0.79 |
| Nmax | 1.669 | |f/f7| | 0.73 |
| (V3 + V4)/|V3 − V4| | 3.35 | |f3/f| | 4.15 |
| CT6/CT7 | 0.56 | |f4/f| | 8.40 |
| TD [mm] | 4.40 | EPD/R14 | 2.47 |
| TL/EPD | 2.12 | Y72/Y62 | 1.26 |
| TL/ImgH | 1.38 | | |

Furthermore, in the optical image capturing lens assembly according to the 5th embodiment, at least one of Abbe numbers of the first lens element 510, the second lens element 520, the third lens element 530, the fourth lens element 540, the fifth lens element 550, the sixth lens element 560 and the seventh lens element 570 is smaller than 20, and at least three of the Abbe numbers are smaller than 40. In detail, in the 5th embodiment, a number of the lens elements with the Abbe number smaller than 20 is 1, that is, the second lens element 520, and a number of the lens elements with the Abbe number smaller than 40 is 3, which are, the second lens element 520, the fourth lens element 540 and the sixth lens element 560.

6th Embodiment

Figure 11:
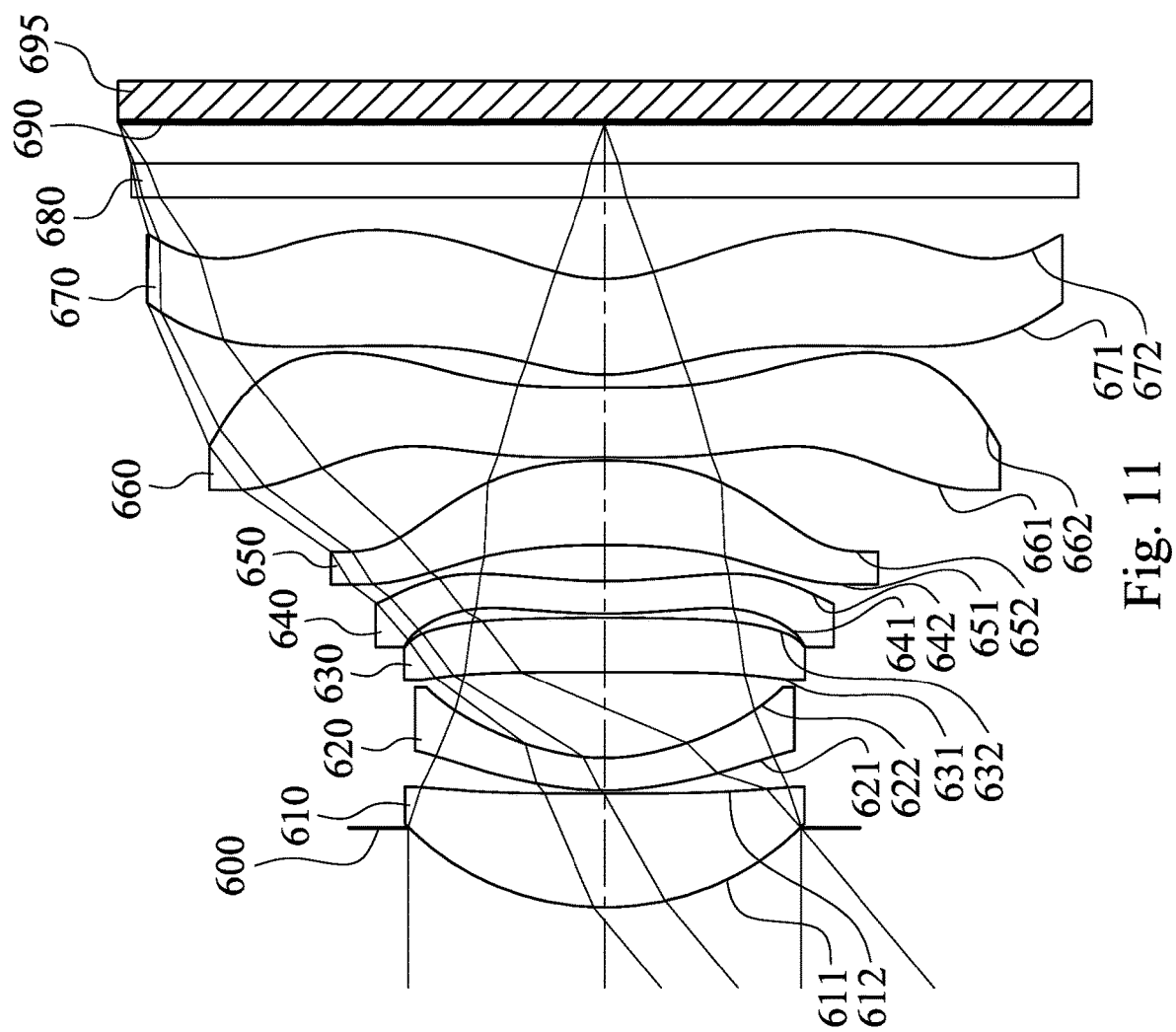
FIG. 11 is a schematic view of an imaging apparatus according to the 6th embodiment of the present disclosure.
Figure 12:
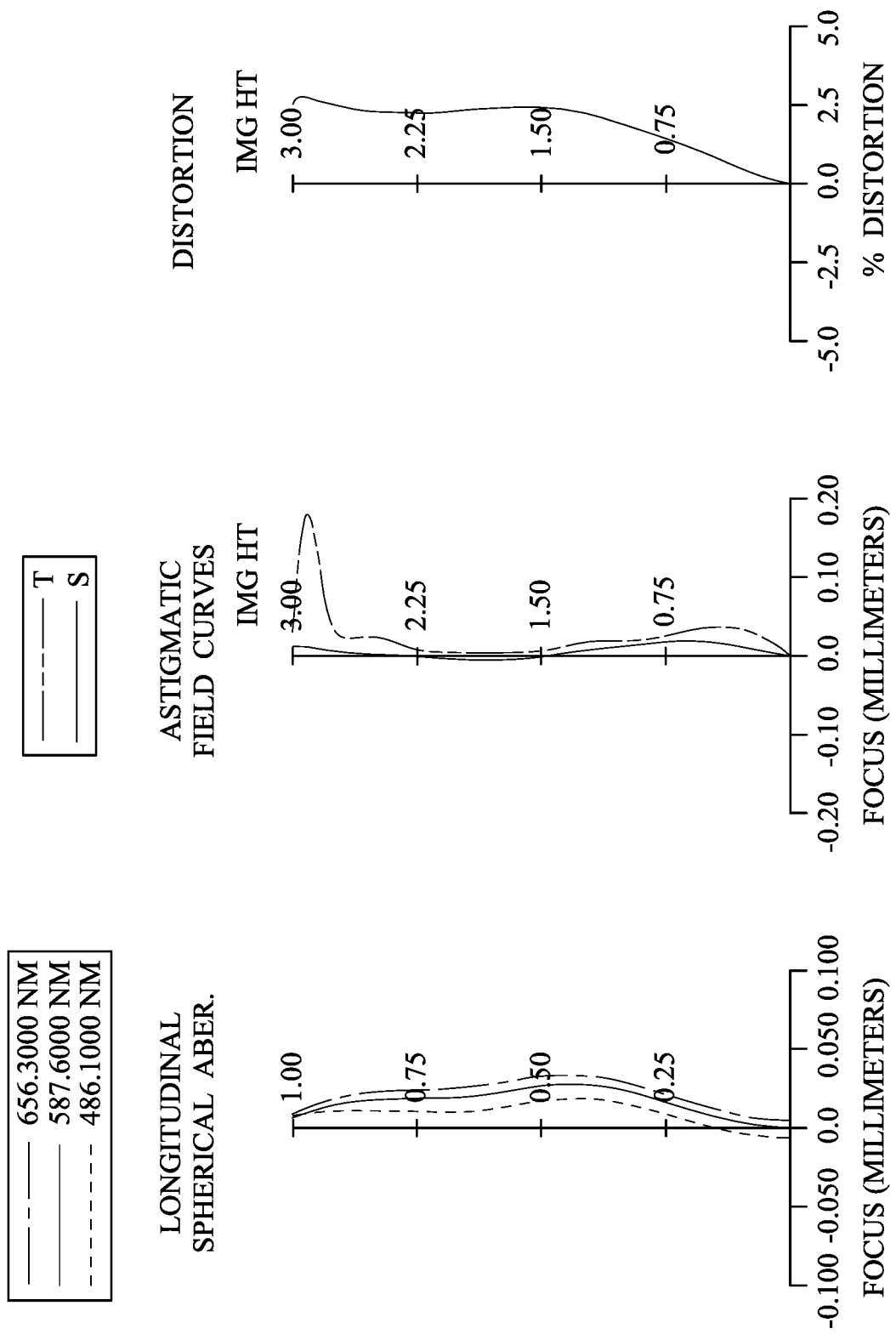
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an optical image capturing lens assembly (its reference numeral is omitted) and an image sensor 695. The optical image capturing lens assembly includes, in order from an object side to an image side, an aperture stop 600, a first lens element 610, a second lens element 620, a third lens element 630, a fourth lens element 640, a fifth lens element 650, a sixth lens element 660, a seventh lens element 670, an IR-cut filter 680 and an image surface 690. The image sensor 695 is disposed on the image surface 690 of the optical image capturing lens assembly. The optical image capturing lens assembly includes seven lens elements (610, 620, 630, 640, 650, 660 and 670) without additional one or more lens elements inserted between the first lens element 610 and seventh lens element 670.

The first lens element 610 with positive refractive power has an object-side surface 611 being convex in a paraxial region thereof and an image-side surface 612 being convex in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being concave in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, the object-side surface 641 of the fourth lens element 640 includes at least one concave critical point in an off-axis region thereof, and the image-side surface 642 of the fourth lens element 640 includes at least one convex critical point in an off-axis region thereof.

The fifth lens element 650 with positive refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric. Furthermore, the image-side surface 652 of the fifth lens element 650 includes at least one concave critical point in an off-axis region thereof.

The sixth lens element 660 with negative refractive power has an object-side surface 661 being concave in a paraxial region thereof and an image-side surface 662 being convex in a paraxial region thereof. The sixth lens element 660 is made of a plastic material, and has the object-side surface 661 and the image-side surface 662 being both aspheric. Furthermore, the object-side surface 661 of the sixth lens element 660 includes at least one concave critical point, at least one convex critical point and at least one inflection point in an off-axis region thereof, and the image-side surface 662 of the sixth lens element 660 includes at least one concave critical point and at least one convex critical point in an off-axis region thereof.

The seventh lens element 670 with positive refractive power has an object-side surface 671 being convex in a paraxial region thereof and an image-side surface 672 being concave in a paraxial region thereof. The seventh lens element 670 is made of a plastic material, and has the object-side surface 671 and the image-side surface 672 being both aspheric. Furthermore, the object-side surface 671 of the seventh lens element 670 includes at least one concave critical point and at least one convex critical point in an off-axis region thereof, and the image-side surface 672 of the seventh lens element 670 includes at least one concave critical point and at least one convex critical point in an off-axis region thereof.

The IR-cut filter 680 is made of a glass material and disposed between the seventh lens element 670 and the image surface 690 and will not affect the focal length of the optical image capturing lens assembly.

The detailed optical data of the 6th embodiment are shown in Table 11 and the aspheric surface data are shown in Table 12 below.

TABLE 11

6th Embodiment
f = 3.51 mm, Fno = 1.45, HFOV = 39.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.490 | | | | |
| 2 | Lens 1 | 1.786 | ASP | 0.702 | Plastic | 1.545 | 56.0 | 3.26 |
| 3 | | −200.000 | ASP | 0.020 | | | | |
| 4 | Lens 2 | 1.985 | ASP | 0.200 | Plastic | 1.669 | 19.5 | −6.42 |
| 5 | | 1.303 | ASP | 0.531 | | | | |
| 6 | Lens 3 | −45.246 | ASP | 0.336 | Plastic | 1.544 | 56.0 | 31.59 |
| 7 | | −12.488 | ASP | 0.026 | | | | |
| 8 | Lens 4 | 4.204 | ASP | 0.200 | Plastic | 1.669 | 19.5 | −34.04 |
| 9 | | 3.481 | ASP | 0.222 | | | | |
| 10 | Lens 5 | −7.896 | ASP | 0.520 | Plastic | 1.544 | 56.0 | 10.24 |
| 11 | | −3.341 | ASP | 0.020 | | | | |
| 12 | Lens 6 | −24.136 | ASP | 0.434 | Plastic | 1.511 | 56.8 | −53.48 |
| 13 | | −208.333 | ASP | 0.080 | | | | |
| 14 | Lens 7 | 1.179 | ASP | 0.590 | Plastic | 1.544 | 56.0 | 119.67 |
| 15 | | 0.989 | ASP | 0.500 | | | | |
| 16 | IR-cut filter | Plano | | 0.210 | Glass | 1.517 | 64.2 | — |
| 17 | | Plano | | 0.255 | | | | |
| 18 | Image | Plano | | — | | | | |

Reference wavelength is 587.6 nm (d-line).
Effective radius of Surface 12 is 2.236 mm.

TABLE 12

Aspheric Coefficients

| Surface # | 2 | 3 | 4 | 5 | 6 |
|---|---|---|---|---|---|
| k = | 3.8805E−01 | −1.0000E+00 | −5.1405E+00 | −3.2399E+00 | −9.0000E+01 |
| A4 = | 5.6883E−04 | 5.6243E−02 | −4.3923E−02 | −2.1519E−02 | 3.1478E−03 |
| A6 = | −1.3704E−02 | −3.0835E−02 | 1.1916E−01 | 1.4715E−01 | 1.5794E−02 |
| A8 = | 3.2780E−02 | −1.1338E−02 | −2.0808E−01 | −2.3956E−01 | −1.4892E−01 |
| A10 = | −4.7108E−02 | 3.6486E−02 | 2.2253E−01 | 3.0243E−01 | 2.2612E−01 |
| A12 = | 3.1828E−02 | −2.2680E−02 | −1.2530E−01 | −2.0687E−01 | −1.6175E−01 |
| A14 = | −8.3653E−03 | 3.5982E−03 | 2.6456E−02 | 6.0794E−02 | 4.6561E−02 |

| Surface # | 7 | 8 | 9 | 10 | 11 |
|---|---|---|---|---|---|
| k = | 2.1194E+01 | −1.9465E+00 | −1.8611E+01 | 9.0923E+00 | −1.1768E−01 |
| A4 = | 7.8744E−02 | −6.0388E−02 | −8.3978E−02 | −2.4702E−01 | −4.0915E−01 |
| A6 = | −2.1411E−01 | −1.0149E−01 | 4.8903E−02 | 3.4475E−01 | 6.3335E−01 |
| A8 = | 2.9196E−01 | 6.0404E−02 | −8.0015E−02 | −3.0324E−01 | −6.8417E−01 |
| A10 = | −3.6626E−01 | −4.8318E−02 | −4.3001E−03 | 1.6705E−01 | 4.4824E−01 |
| A12 = | 2.6916E−01 | −7.9759E−02 | 5.3925E−02 | −4.7430E−02 | −1.5894E−01 |
| A14 = | −7.7629E−02 | 1.4854E−01 | −2.7773E−02 | 5.2488E−03 | 2.8371E−02 |
| A16 = | | −5.6673E−02 | 4.4163E−03 | | −2.0095E−03 |

| Surface # | 12 | 13 | 14 | 15 |
|---|---|---|---|---|
| k = | −4.6615E+01 | 4.5000E+01 | −5.3878E+00 | −4.0962E+00 |
| A4 = | 2.1065E−01 | 2.4874E−01 | −1.9309E−01 | −1.1731E−01 |
| A6 = | −1.8620E−01 | −2.0643E−01 | 1.0849E−01 | 5.0859E−02 |
| A8 = | 6.3628E−02 | 8.6412E−02 | −3.3632E−02 | −1.7043E−02 |
| A10 = | −1.0821E−02 | −2.1964E−02 | 6.2501E−03 | 3.5459E−03 |
| A12 = | 9.2219E−04 | 3.3635E−03 | −6.8125E−04 | −4.0878E−04 |
| A14 = | −3.1466E−05 | −2.8956E−04 | 4.0323E−05 | 2.4561E−05 |
| A16 = | | 1.0834E−05 | −1.0058E−06 | −6.1398E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th embodiment | | | |
|---|---|---|---|
| f [mm] | 3.51 | TL × TL/(ImgH × EPD) | 3.23 |
| Fno | 1.45 | f/|R11| + f/|R12| | 0.16 |
| HFOV [deg,] | 39.7 | (f/f6) + (f/f7) | −0.04 |
| Nmax | 1.669 | |f/f7| | 0.03 |
| (V3 + V4)/|V3 − V4| | 2.06 | |f3/f| | 9.00 |
| CT6/CT7 | 0.74 | |f4/f| | 9.70 |
| TD [mm] | 3.88 | EPD/R14 | 2.45 |
| TL/EPD | 2.00 | Y72/Y62 | 1.15 |
| TL/ImgH | 1.62 | | |

Furthermore, in the optical image capturing lens assembly according to the 6th embodiment, at least one of Abbe numbers of the first lens element 610, the second lens element 620, the third lens element 630, the fourth lens element 640, the fifth lens element 650, the sixth lens element 660 and the seventh lens element 670 is smaller than 20. In detail, in the 6th embodiment, a number of the lens elements with the Abbe number smaller than 20 is 2, which are, the second lens element 620 and the fourth lens element 640.

7th Embodiment

Figure 13:
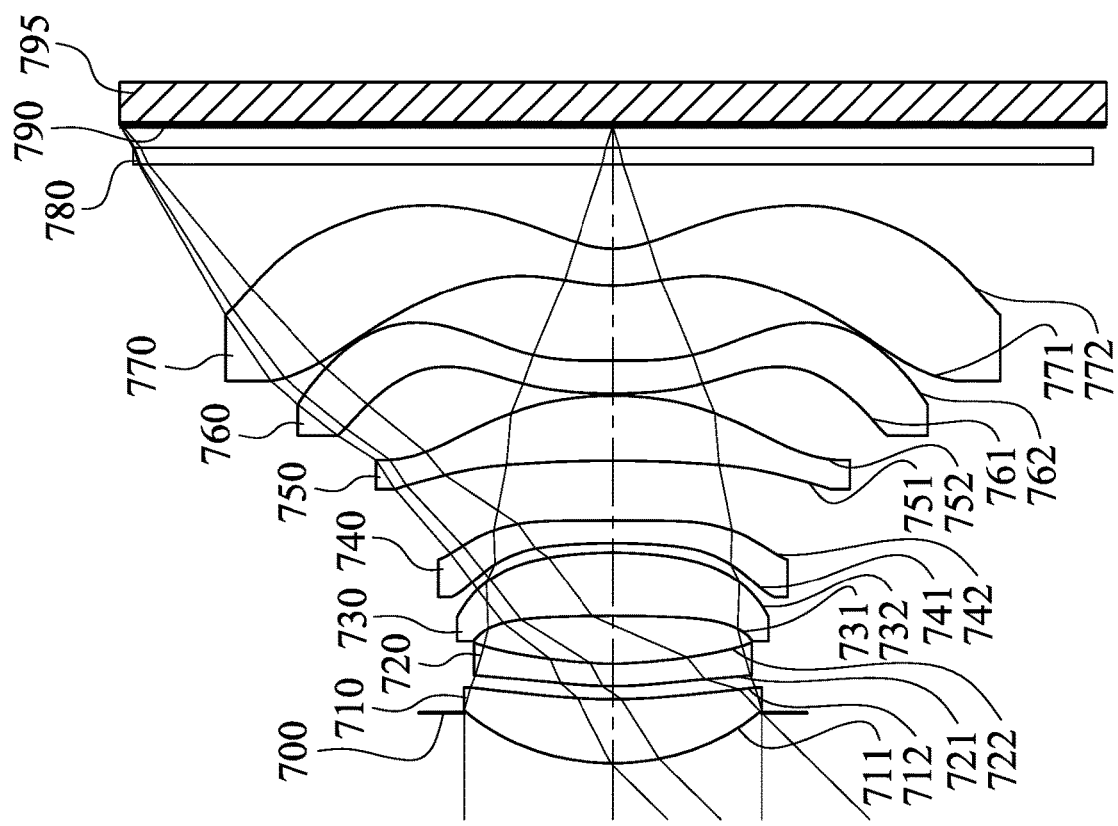
FIG. 13 is a schematic view of an imaging apparatus according to the 7th embodiment of the present disclosure.
Figure 14:
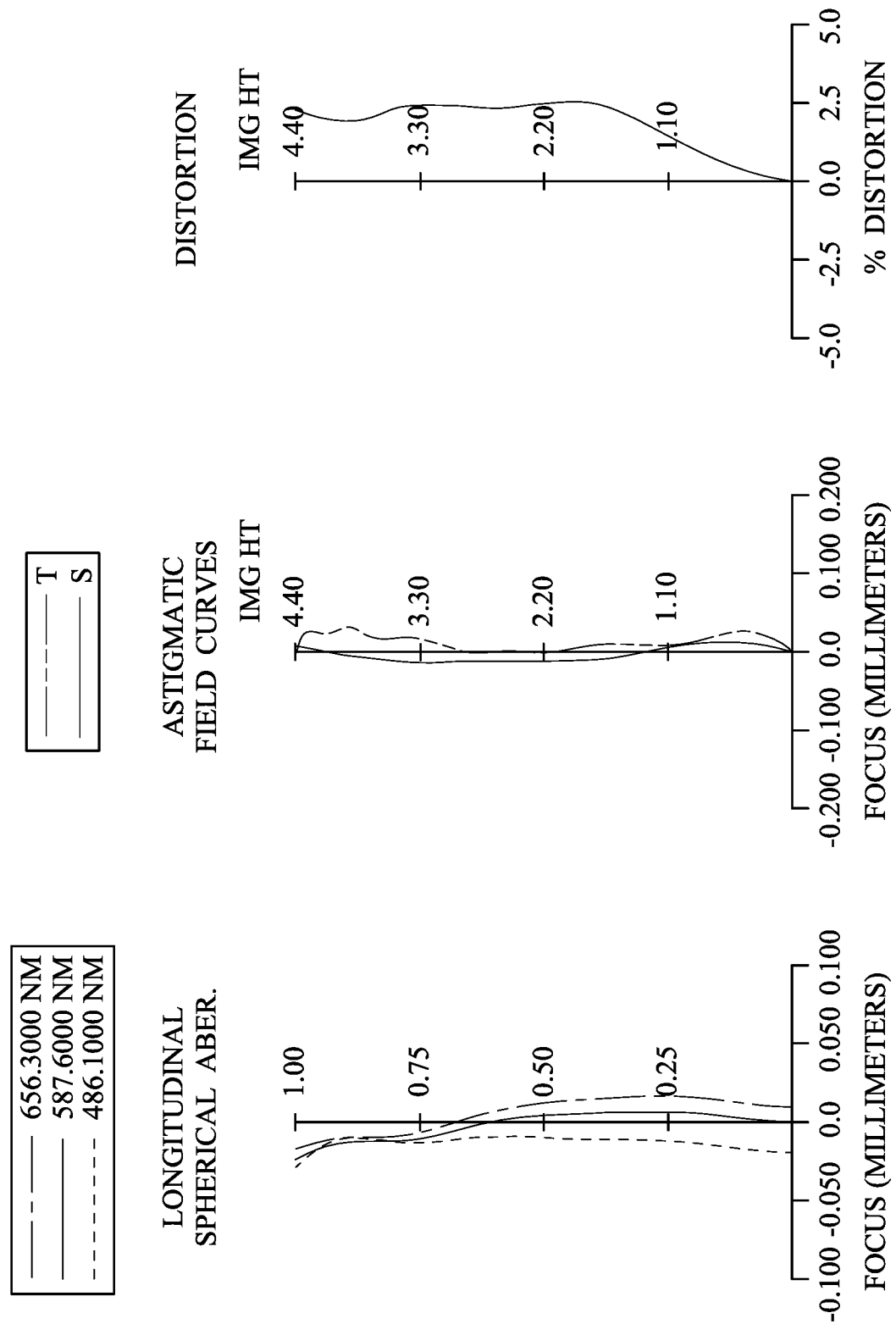
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present, disclosure. FIG. 14 shows spherical aberration curves, astigmatic field curves and a distortion curve of the imaging apparatus according to the 7th embodiment. In FIG. 13, the imaging apparatus includes an optical image capturing lens assembly (its reference numeral is omitted) and an image sensor 795. The optical image capturing lens assembly includes, in order from an object side to an image side, an aperture stop 700, a first lens element 710, a second lens element 720, a third lens element 730, a fourth lens element 740, a fifth lens element 750, a sixth lens element 760, a seventh lens element 770, an IR-cut filter 780 and an image surface 790. The image sensor 795 is disposed on the image surface 790 of the optical image capturing lens assembly. The optical image capturing lens assembly includes seven lens elements (710, 720, 730, 740, 750, 760 and 770) without additional one or more lens elements inserted between the first lens element 710 and seventh lens element 770.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the object-side surface 761 of the sixth lens element 760 includes at least one concave critical point and at least one inflection point in an off-axis region thereof, and the image-side surface 762 of the sixth lens element 760 includes at least one convex critical point in an off-axis region thereof.

The seventh lens element 770 with negative refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric. Furthermore, the object-side surface 771 of the seventh lens element 770 includes at least one concave critical point in an off-axis region thereof, and the image-side surface 772 of the seventh lens element 770 includes at least one convex critical point in an off-axis region thereof.

The IR-cut filter 780 is made of a glass material and disposed between the seventh lens element 770 and the image surface 790 and will not affect the focal length of the optical image capturing lens assembly.

The detailed optical data of the 7th embodiment are shown in Table 13 and the aspheric surface data are shown in Table 14 below.

TABLE 13

7th Embodiment
f = 4.25 mm, Fno = 1.60, HFOV = 45.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.450 | | | | |
| 2 | Lens 1 | 2.215 | ASP | 0.570 | Plastic | 1.545 | 56.0 | 7.05 |
| 3 | | 4.760 | ASP | 0.118 | | | | |
| 4 | Lens 2 | 3.518 | ASP | 0.200 | Plastic | 1.669 | 19.5 | −132.50 |
| 5 | | 3.306 | ASP | 0.426 | | | | |
| 6 | Lens 3 | −19.213 | ASP | 0.571 | Plastic | 1.544 | 56.0 | 6.77 |
| 7 | | −3.124 | ASP | 0.085 | | | | |
| 8 | Lens 4 | −5.238 | ASP | 0.200 | Plastic | 1.669 | 19.5 | −8.10 |
| 9 | | −159.779 | ASP | 0.535 | | | | |
| 10 | Lens 5 | −16.959 | ASP | 0.578 | Plastic | 1.566 | 37.4 | 7.96 |
| 11 | | −3.605 | ASP | 0.020 | | | | |
| 12 | Lens 6 | 5.980 | ASP | 0.293 | Plastic | 1.544 | 56.0 | 11.13 |
| 13 | | 487.642 | ASP | 0.677 | | | | |
| 14 | Lens 7 | 1.521 | ASP | 0.327 | Plastic | 1.511 | 56.8 | −4.14 |
| 15 | | 0.820 | ASP | 0.750 | | | | |
| 16 | IR-cut filter | Plano | | 0.150 | Glass | 1.517 | 64.2 | — |
| 17 | | Plano | | 0.206 | | | | |
| 18 | Image | Plano | | — | | | | |

Reference wavelength is 587.6 nm (d-line).
Effective radius of Surface 4 is 1.230 mm.
Effective radius of Surface 12 is 2.453 mm.

TABLE 14

Aspheric Coefficients

| Surface # | 2 | 3 | 4 | 5 | 6 |
|---|---|---|---|---|---|
| k = | 8.4414E−02 | −1.0000E+00 | −2.9836E+01 | −2.5779E+01 | −9.0000E+01 |
| A4 = | 1.3246E−03 | −4.6803E−02 | −1.0599E−02 | 3.4033E−02 | −2.0270E−02 |
| A6 = | 1.1185E−02 | 1.8952E−02 | −9.0127E−02 | −1.0505E−01 | −6.6845E−03 |
| A8 = | −2.6681E−02 | 7.1578E−03 | 1.6623E−01 | 1.7059E−01 | −5.6762E−02 |
| A10 = | 4.3045E−02 | −1.6178E−02 | −1.5075E−01 | −1.5265E−01 | 1.0831E−01 |
| A12 = | −3.6811E−02 | 9.9188E−03 | 8.2412E−02 | 8.6601E−02 | −1.1543E−01 |
| A14 = | 1.6272E−02 | −2.0786E−03 | −2.4982E−02 | −2.8459E−02 | 6.0977E−02 |
| A16 = | −2.9079E−03 | −1.8798E−04 | 3.1174E−03 | 4.3188E−03 | −1.3984E−02 |

| Surface # | 7 | 8 | 9 | 10 | 11 |
|---|---|---|---|---|---|
| k = | 2.6445E+00 | 7.7698E+00 | 9.0000E+01 | −7.3908E+01 | 8.9939E−01 |
| A4 = | 1.3057E−01 | 1.1435E−01 | 9.8077E−03 | −3.9256E−02 | −1.2888E−01 |
| A6 = | −3.0644E−01 | −4.0758E−01 | −1.7650E−01 | 4.8549E−02 | 1.3922E−01 |
| A8 = | 3.1972E−01 | 4.0175E−01 | 1.8009E−01 | −3.5432E−02 | −8.1917E−02 |
| A10 = | −2.1035E−01 | −2.1302E−01 | −1.1013E−01 | 1.2266E−02 | 2.8748E−02 |
| A12 = | 7.2940E−02 | 4.2700E−02 | 4.1583E−02 | −2.0388E−03 | −5.5659E−03 |
| A14 = | −9.5218E−03 | 8.0618E−03 | −8.9267E−03 | 1.4966E−04 | 5.4955E−04 |
| A16 = | −4.2374E−04 | −3.1584E−03 | 8.9693E−04 | −3.8268E−06 | −2.1636E−05 |

| Surface # | 12 | 13 | 14 | 15 |
|---|---|---|---|---|
| k = | −1.7101E−02 | 9.0000E+01 | −1.2697E+01 | −4.2490E+00 |
| A4 = | 1.2763E−01 | 2.7816E−01 | −1.7870E−01 | −9.9336E−02 |
| A6 = | −7.7241E−02 | −1.9280E−01 | 7.5149E−02 | 4.1849E−02 |
| A8 = | 7.8460E−03 | 6.5990E−02 | −1.8118E−02 | −1.1673E−02 |
| A10 = | 3.3838E−03 | −1.3566E−02 | 2.5727E−03 | 1.9308E−03 |
| A12 = | −1.1452E−03 | 1.6609E−03 | −2.1008E−04 | −1.8097E−04 |
| A14 = | 1.3443E−04 | −1.1101E−04 | 9.1756E−06 | 8.8206E−06 |
| A16 = | −5.6502E−06 | 3.1078E−06 | −1.6709E−07 | −1.7301E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th embodiment | | | |
|---|---|---|---|
| f [mm] | 4.25 | TL × TL/(TL/ImgH × EPD) | 2.79 |
| Fno | 1.60 | f/\|R11\| + f/\|R12\| | 0.72 |
| HFOV [deg.] | 45.4 | (f/f6) + (f/f7) | −0.64 |
| Nmax | 1.669 | \|f/f7\| | 1.03 |
| (V3 + V4)/\|V3 − V4\| | 2.06 | \|f3/f\| | 1.59 |
| CT6/CT7 | 0.90 | \|f4/f\| | 1.91 |
| TD [mm] | 4.60 | EPD/R14 | 3.24 |
| TL/EPD | 2.15 | Y72/Y62 | 1.23 |
| TL/ImgH | 1.30 | | |

Furthermore, in the optical image capturing lens assembly according to the 7th embodiment, at least one of Abbe numbers of the first lens element 710, the second lens element 720, the third lens element 730, the fourth lens element 740, the fifth lens element 750, the sixth lens element 760 and the seventh lens element 770 is smaller than 20, and at least three of the Abbe numbers are smaller than 40. In detail, in the 7th embodiment, a number of the lens elements with Abbe number smaller than 20 is 2, which are, the second lens element 720 and the fourth lens element 740, and a number of the lens elements with Abbe number smaller than 40 is 3, which are, the second lens element 720, the fourth lens element 740 and the fifth lens element 750.

8th Embodiment

Figure 16:
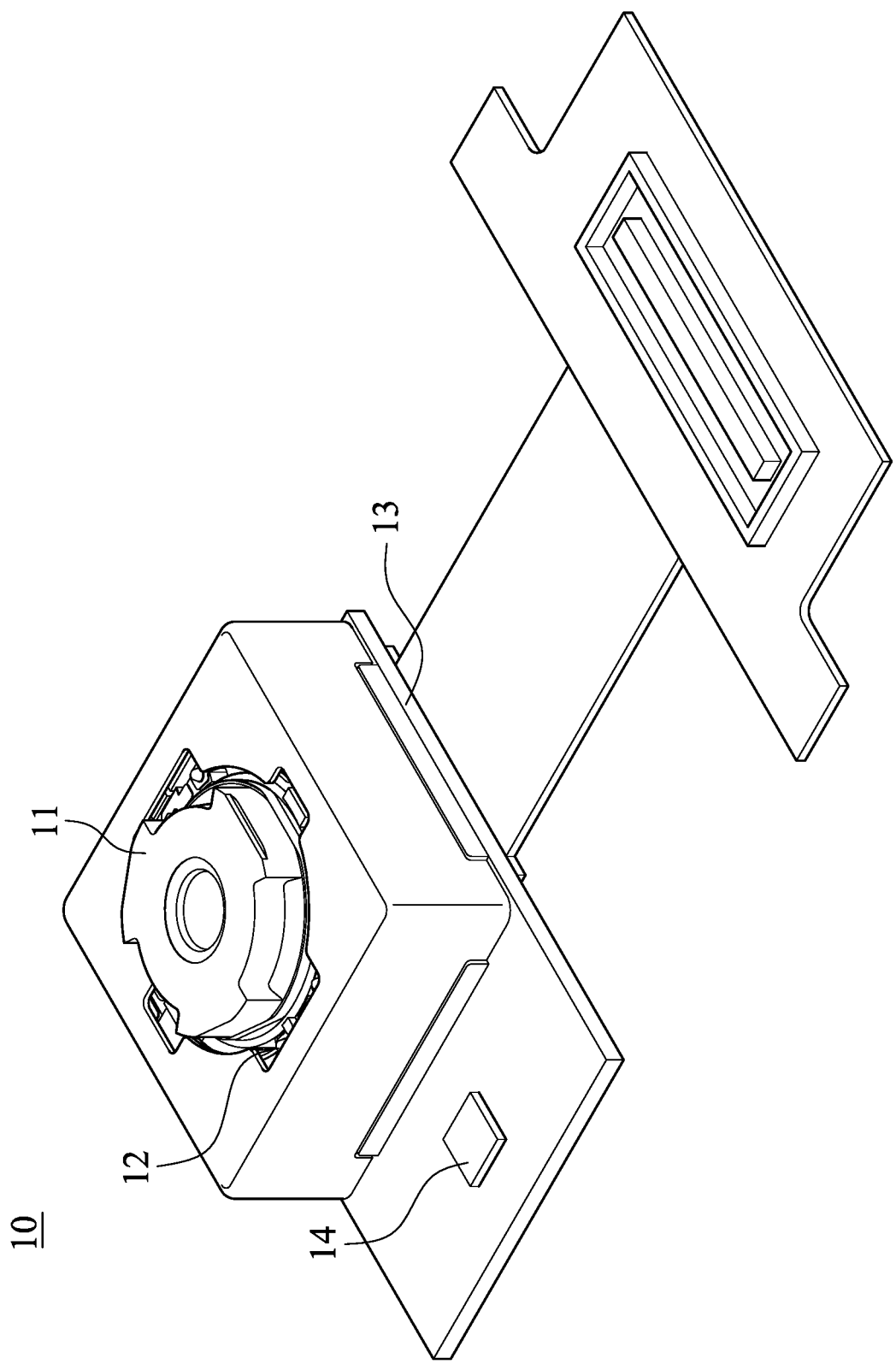
FIG. 16 is a three-dimensional schematic view of an imaging apparatus according to the 8th embodiment of the present disclosure.

FIG. 16 is a three-dimensional schematic view of an imaging apparatus 10 according to the 8th embodiment of the present disclosure. As shown in FIG. 16, the imaging apparatus 10 is a camera module and includes an imaging lens assembly 11, a driving apparatus 12 and an image sensor 13, wherein the imaging lens assembly 11 includes the optical image capturing lens assembly according to the 1st embodiment and a lens barrel (its reference numeral is omitted) for carrying the optical image capturing lens assembly. The imaging apparatus 10 can converge light by utilizing the imaging lens assembly 11 for capturing the imaged object and can focus by the driving apparatus 12, so that the image can be clearly formed on the image sensor 13, and then the image data can be transmitted.

The driving apparatus 12 can be an Auto-Focus module, which can be driven by driving systems, such as voice coil motors (VCM), micro electro-mechanical systems (MEMS), piezoelectric systems, and shape memory alloys etc. The optical image capturing lens assembly can obtain a favorable imaging position with the driving apparatus 12 so as to capture clear images with different object distances.

The imaging apparatus 10 can include the image sensor 13 which has high photosensitivity and low noise disposed on the image surface of the optical image capturing lens assembly, such as CMOS and CCD, thus the high image quality of the optical image capturing lens assembly can be truly presented.

Moreover, the imaging apparatus 10 can include an image stabilization module 14, which can be a dynamic sensing element such as an accelerator, a gyroscope or a Hall effect sensor. In the 8th embodiment, the image stabilization module 14 is a gyroscope but not be limited thereto. By adjusting the variation of different axial directions of the optical image capturing lens assembly, the image blur generated by motion during exposure can be compensated, so that it is favorable for enhancing the image quality under dynamic and low illumination situation. Furthermore, advanced image compensation functions, such as optical image stabilizations (OIS) and electronic image stabilizations (EIS) etc., can be provided.

9th Embodiment

Figure 17A:
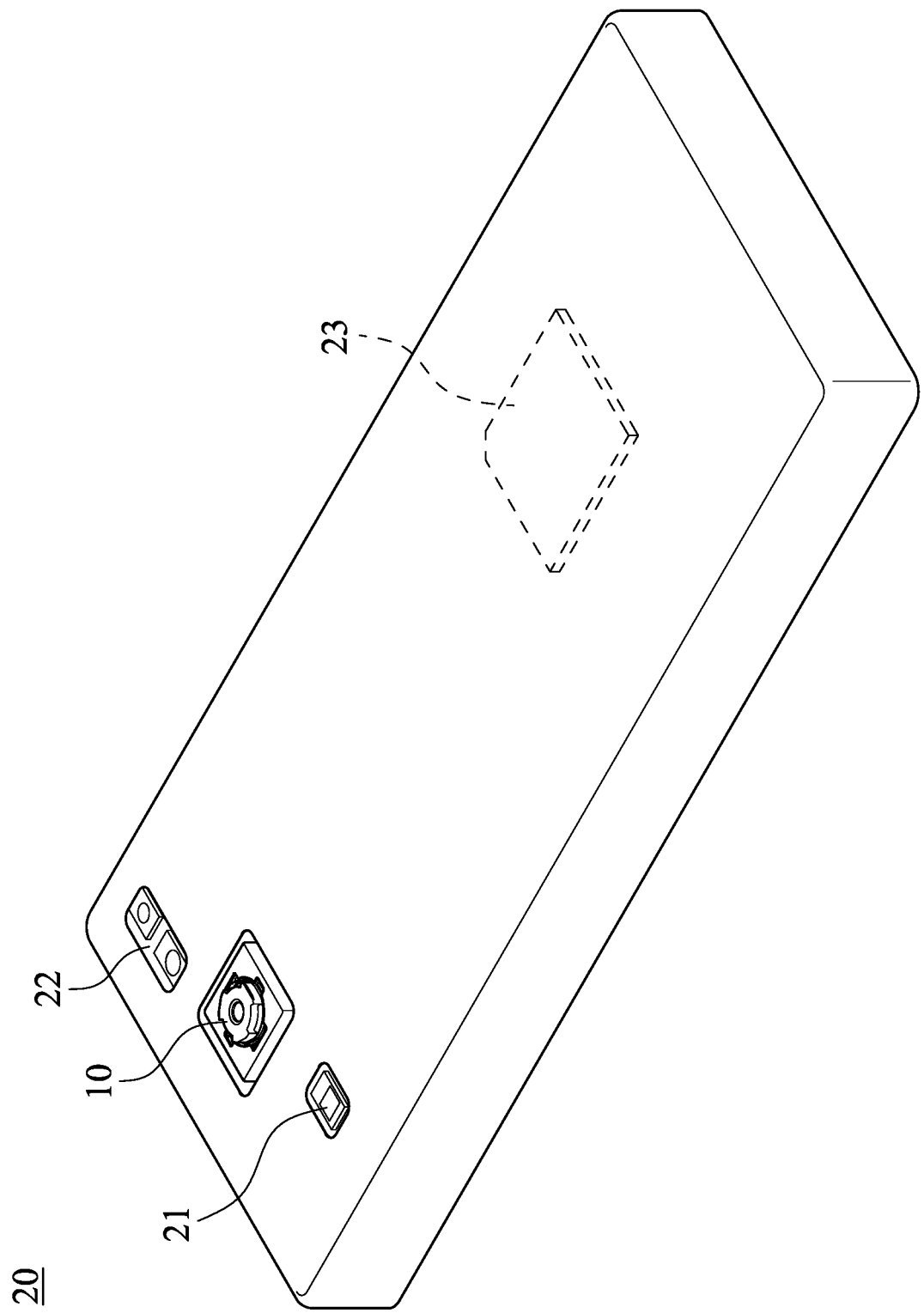
FIG. 17A is a schematic view of one side of an electronic device according to the 9th embodiment of the present disclosure.
Figure 17B:
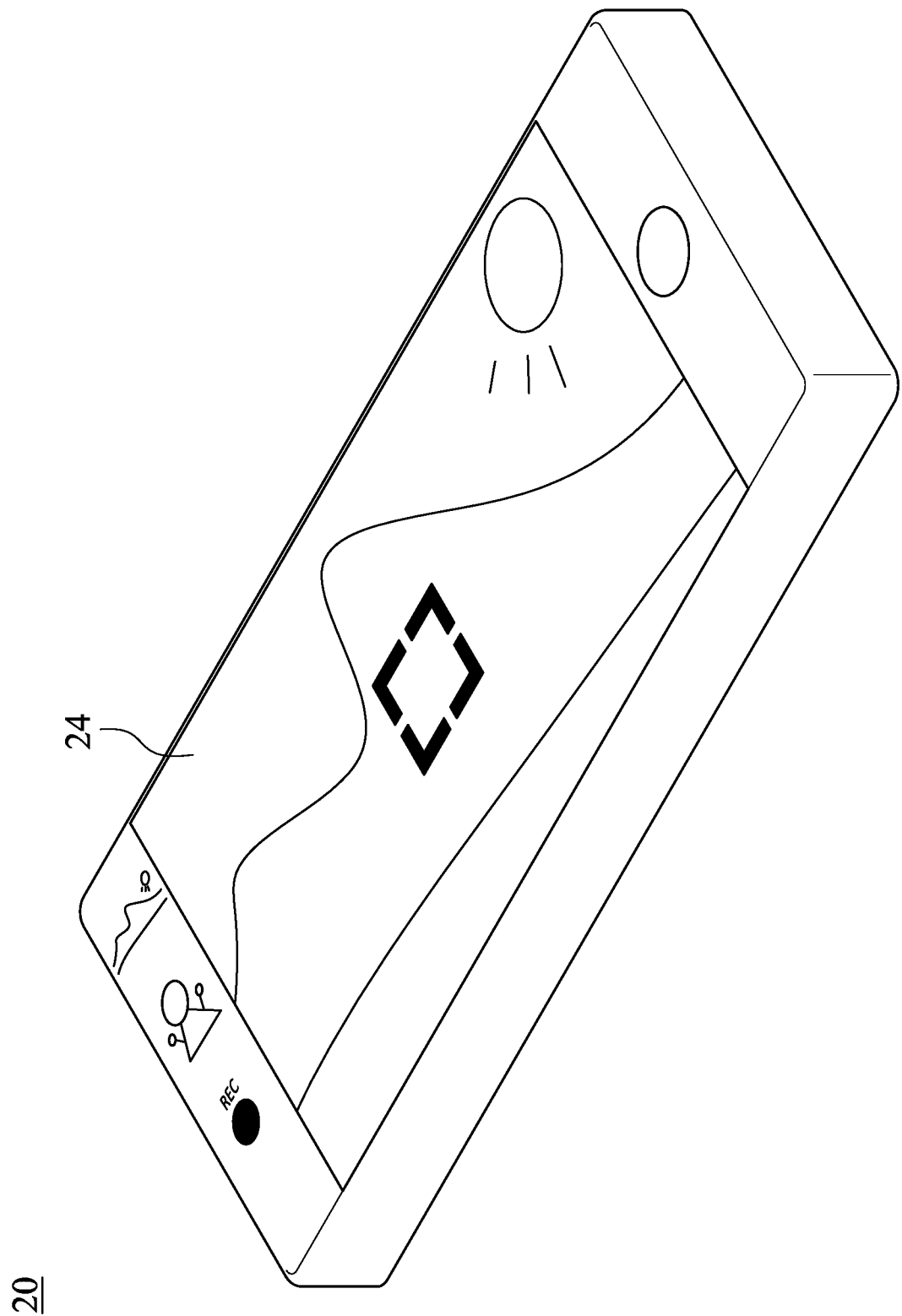
FIG. 17B is a schematic view of another side of the electronic device in FIG. 17A.
Figure 17C:
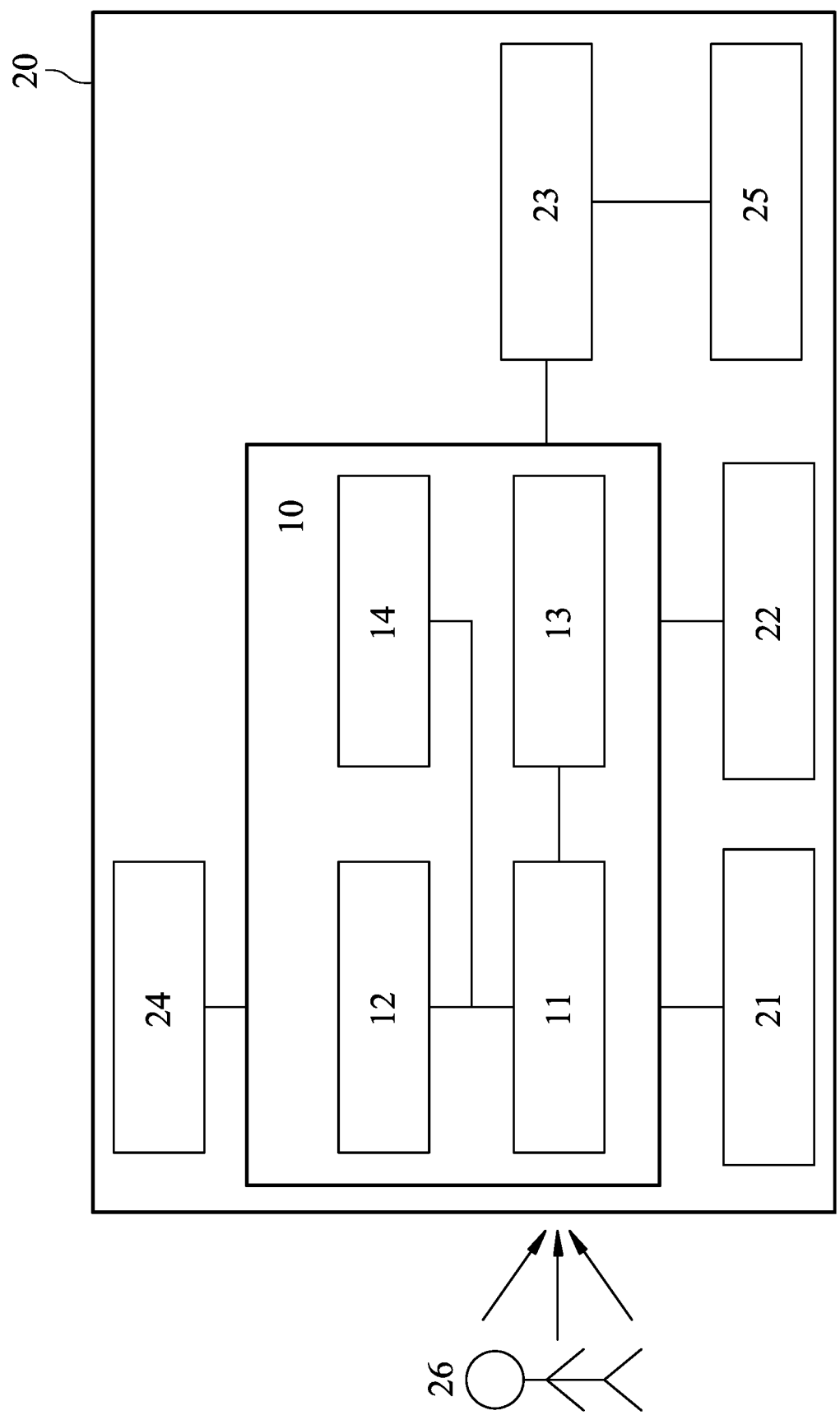
FIG. 17C is a schematic view of a system of the electronic device in FIG. 17A.

FIG. 17A is a schematic view of one side of an electronic device 20 according to the 9th embodiment of the present disclosure. FIG. 17B is a schematic view of another side of the electronic device 20 in FIG. 17A. FIG. 17C is a schematic view of a system of the electronic device 20 in FIG. 17A. As shown in FIG. 17A, FIG. 17B and FIG. 17C, the electronic device 20 is a smartphone and includes the imaging apparatus 10, a flash module 21, a focusing assisting module 22, an image signal processor 23 (ISP), a user interface 24 and an image software processor 25. When a user captures images of an object 26 via the user interface 24, the electronic device 20 converges light and captures image via the imaging apparatus 10, compensates light via the flash module 21, quickly focuses on the object 26 according to its distance information provided by the focusing assisting module 22, and optimizes the image via the image signal processor 23 and the image software processor 25, thus the image quality of the images captured by the optical image capturing lens assembly can be further enhanced. Wherein, the focusing assisting module 22 can adopt infrared or laser for obtaining quick focusing, and the user interface 24 can utilize a touch screen or a physical button for capturing and processing the image with various functions of the image processing software.

The imaging apparatus 10 according to the 9th embodiment is the same as the imaging apparatus 10 according to the 8th embodiment, so an explanation in this regard will not be provided again.

10th Embodiment

Figure 18:
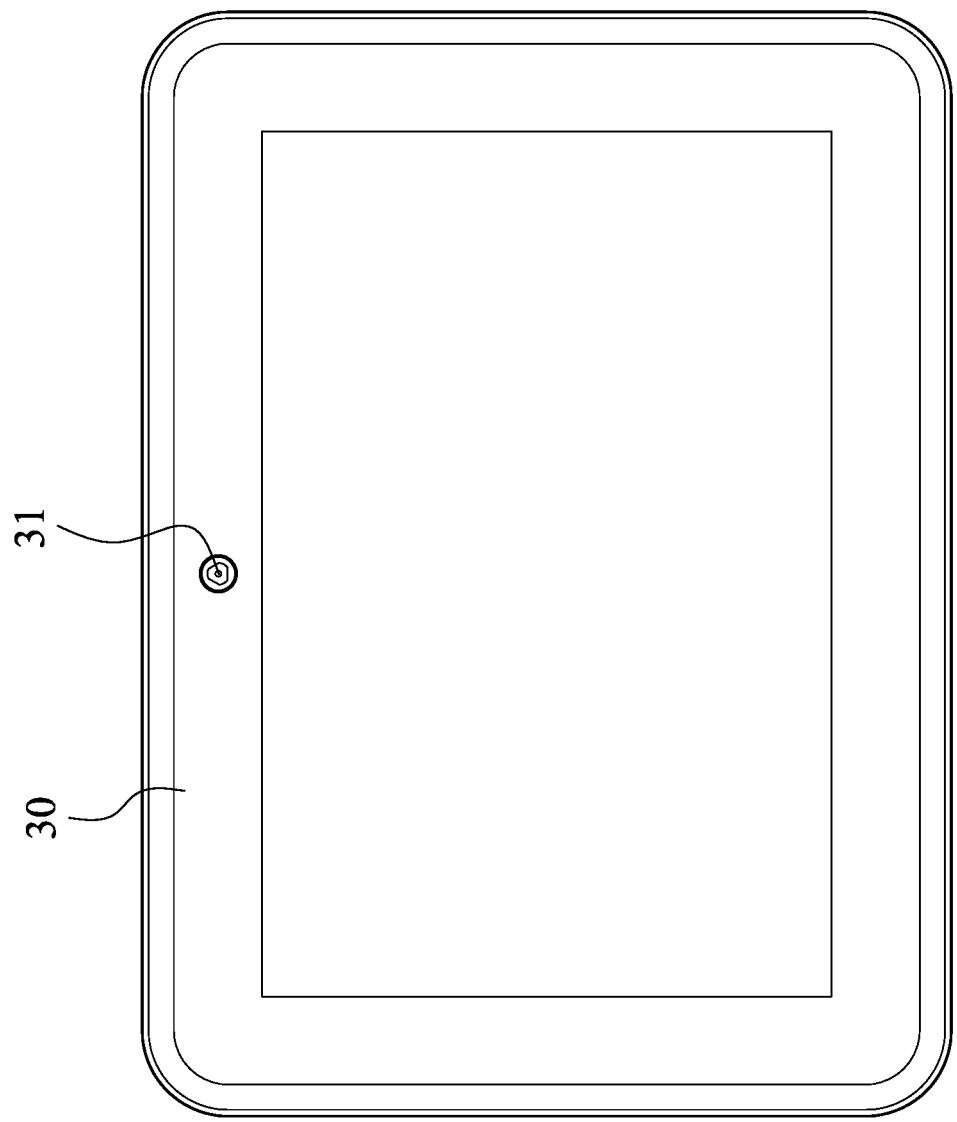
FIG. 18 is a schematic view of an electronic device according to the 10th embodiment of the present disclosure.

FIG. 18 is a schematic view of an electronic device 30 according to the 10th embodiment of the present disclosure. The electronic device 30 is a tablet personal computer and includes an imaging apparatus 31. The imaging apparatus 31 can be the same as that of the 8th embodiment, so an explanation in this regard will not be provided again.

11th Embodiment

Figure 19:
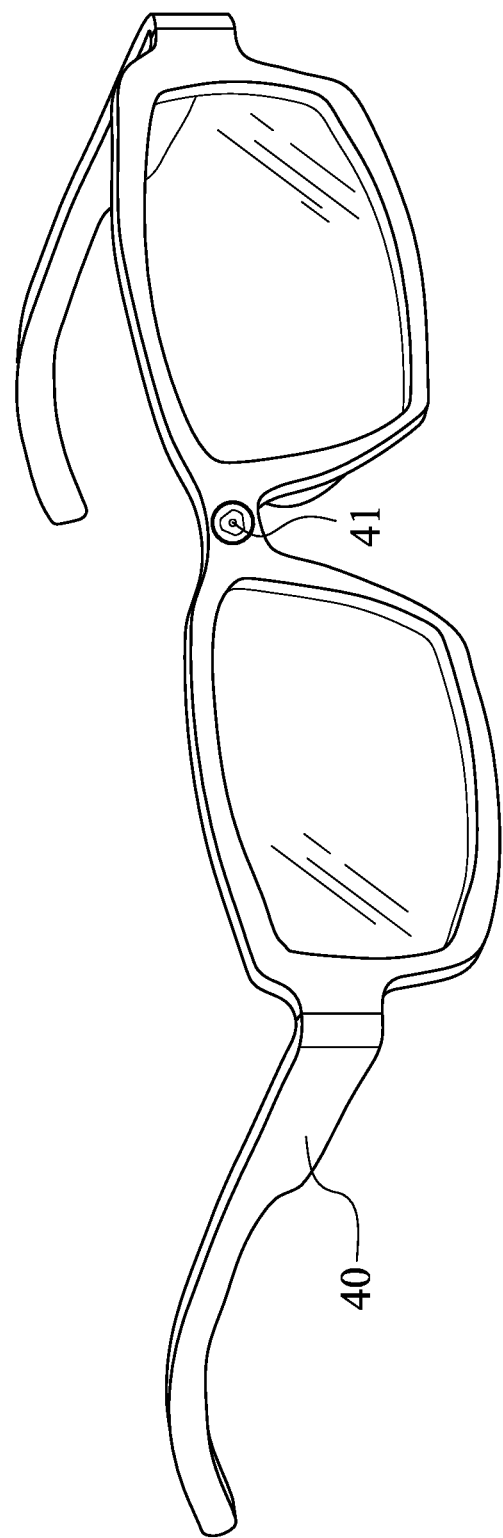
FIG. 19 is a schematic view of an electronic device according to the 11th embodiment of the present disclosure.

FIG. 19 is a schematic view of an electronic device 40 according to the 11th embodiment of the present disclosure. The electronic device 40 is a wearable device and includes an imaging apparatus 41. The imaging apparatus 41 can be the same as that of the 8th embodiment, so an explanation in this regard will not be provided again.

The foregoing description, for purpose of explanation, has been described with reference to specific embodiments. It is to be noted that Tables 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image capturing lens assembly comprising seven lens elements, the seven lens elements being, in order from an object side to an image side:
   a first lens element, a second lens element, a third lens element, a fourth lens element, a fifth lens element, a sixth lens element, and a seventh lens element;
   wherein the second lens element has negative refractive power, both of an object-side surface and an image-side surface of the sixth lens element are aspheric, the seventh lens element has negative refractive power, and at least one of object-side surfaces and image-side surfaces of the fifth lens element and the sixth lens element comprises at least one critical point in an off-axis region thereof;
   wherein a focal length of the optical image capturing lens assembly is f, a curvature radius of the object-side surface of the sixth lens element is R11, a curvature radius of the image-side surface of the sixth lens element is R12, an axial distance between an object-side surface of the first lens element and an image surface is TL, a maximum image height of the optical image capturing lens assembly is ImgH, an entrance pupil diameter of the optical image capturing lens assembly is EPD, an f-number of the optical image capturing lens assembly is Fno, a central thickness of the sixth lens element is CT6, a central thickness of the seventh lens element is CT7, and the following conditions are satisfied:

$f/|R11|+f/|R12|<1.35$;

$1.0<TL/\text{ImgH} \leq 1.6$;

$1.00<TL \times TL/(\text{ImgH} \times EPD)<3.25$;

$1.0<Fno<1.7$; and $0.67 \leq CT6/CT7<1.14$.

2. The optical image capturing lens assembly of claim 1, wherein the first lens element has the object-side surface being convex in a paraxial region thereof, the first lens element has an image-side surface being concave in a paraxial region thereof, and each of the object-side surface and the image-side surface of the sixth lens element comprises at least one critical point in the off-axis region thereof.

3. The optical image capturing lens assembly of claim 1, wherein an Abbe number of the third lens element is V3, an Abbe number of the fourth lens element is V4, and the following condition is satisfied:

$1.5<(V3+V4)/|V3-V4|<10$.

4. The optical image capturing lens assembly of claim 1, wherein the focal length of the optical image capturing lens assembly is f, a focal length of the sixth lens element is f6, a focal length of the seventh lens element is f7, and the following condition is satisfied:

$-0.9<(f/f6)+(f/f7)<1.0$.

5. The optical image capturing lens assembly of claim 1, wherein the seventh lens element has an image-side surface being concave in a paraxial region thereof and comprising at least one convex critical point in an off-axis region thereof, the entrance pupil diameter of the optical image capturing lens assembly is EPD, a curvature radius of the image-side surface of the seventh lens element is R14, a maximum effective radius of the image-side surface of the sixth lens element is Y62, a maximum effective radius of the image-side surface of the seventh lens element is Y72, and the following conditions are satisfied:

$0.90<EPD/R14<10$; and $1.05<Y72/Y62<1.35$.

6. The optical image capturing lens assembly of claim 1, wherein the seventh lens element has an object-side surface being convex in a paraxial region thereof.

7. The optical image capturing lens assembly of claim 1, wherein at least one of Abbe numbers of the first lens element, the second lens element, the third lens element, the fourth lens element, the fifth lens element, the sixth lens element and the seventh lens element is smaller than 20.

8. The optical image capturing lens assembly of claim 1, wherein at least three of Abbe numbers of the first lens element, the second lens element, the third lens element, the fourth lens element, the fifth lens element, the sixth lens element and the seventh lens element are smaller than 40.

9. An imaging apparatus, comprising:
   the optical image capturing lens assembly of claim 1; and
   an image sensor disposed on the image surface of the optical image capturing lens assembly.

10. An electronic device, comprising:
    the imaging apparatus of claim 9.

11. An optical image capturing lens assembly comprising seven lens elements, the seven lens elements being, in order from an object side to an image side:
    a first lens element, a second lens element, a third lens element, a fourth lens element, a fifth lens element, a sixth lens element and a seventh lens element;
    wherein the second lens element has negative refractive power, both of an object-side surface and an image-side surface of the sixth lens element are aspheric, the sixth lens element has positive refractive power, and at least one of object-side surfaces and image-side surfaces of the fourth lens element, the fifth lens element, the sixth lens element and the seventh lens element comprises at least one critical point in an off-axis region thereof;
    wherein at least one of Abbe numbers of the first lens element, the second lens element, the third lens element, the fourth lens element, the fifth lens element, the sixth lens element and the seventh lens element is smaller than 20;
    wherein a focal length of the optical image capturing lens assembly is f, a focal length of the sixth lens element is f6, a focal length of the seventh lens element is f7, a curvature radius of the object-side surface of the sixth lens element is R11, a curvature radius of the image-side surface of the sixth lens element is R12, an axial distance between an object-side surface of the first lens element and an image surface is TL, a maximum image height of the optical image capturing lens assembly is ImgH, an entrance pupil diameter of the optical image capturing lens assembly is EPD, and the following conditions are satisfied:

$f/|R11|+f/|R12|<1.25$;

$-0.9<(f/f6)+(f/f7)<1.0$; and $1.00<TL \times TL/(\text{ImgH} \times EPD)<3.25$.

12. The optical image capturing lens assembly of claim 11, wherein the focal length of the optical image capturing lens assembly is f, the curvature radius of the object-side surface of the sixth lens element is R11, the curvature radius of the image-side surface of the sixth lens element is R12, and the following condition is satisfied:

$$f/|R11|+f/|R12|<0.95.$$

13. The optical image capturing lens assembly of claim 11, wherein the object-side surface of the sixth lens element comprises at least one inflection point and at least one concave critical point in an off-axis region thereof.

14. The optical image capturing lens assembly of claim 11, wherein an Abbe number of the third lens element is V3, an Abbe number of the fourth lens element is V4, and the following condition is satisfied:

$$1.5<(V3+V4)/|V3-V4|<10.$$

15. The optical image capturing lens assembly of claim 11, wherein a central thickness of the sixth lens element is CT6, a central thickness of the seventh lens element is CT7, and the following condition is satisfied:

$$0.10<CT6/CT7<1.50.$$

16. The optical image capturing lens assembly of claim 15, wherein the central thickness of the sixth lens element is CT6, the central thickness of the seventh lens element is CT7, and the following condition is satisfied:

$$0.20<CT6/CT7<1.14.$$

17. The optical image capturing lens assembly of claim 11, wherein the focal length of the optical image capturing lens assembly is f, a focal length of the third lens element is f3, a focal length of the fourth lens element is f4, the focal length of the seventh lens element is f7, and the following conditions are satisfied:

$$0.30<|f3/f|<20;$$

$$0.30<|f4/f|<10; \text{ and}$$

$$|f/f7|<1.25.$$

18. The optical image capturing lens assembly of claim 11, wherein the seventh lens element has the image-side surface being concave in a paraxial region thereof and comprising at least one convex critical point in an off-axis region thereof, the entrance pupil diameter of the optical image capturing lens assembly is EPD, a curvature radius of the image-side surface of the seventh lens element is R14, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a maximum refractive index among N1, N2, N3, N4, N5, N6 and N7 is Nmax, and the following conditions are satisfied:

$$0.90<EPD/R14<10; \text{ and}$$

$$1.65 \leq Nmax.$$

19. The optical image capturing lens assembly of claim 11, wherein the first lens element has positive refractive power, an axial distance between the object-side surface of the first lens element and the image-side surface of the seventh lens element is TD, the axial distance between the object-side surface of the first lens element and the image surface is TL, the entrance pupil diameter of the optical image capturing lens assembly is EPD, and the following conditions are satisfied:

$$TD<7 \text{ mm; and}$$

$$1.0<TL/EPD \leq 2.3.$$

20. The optical image capturing lens assembly of claim 11, wherein the third lens element has an object-side surface being concave in a paraxial region thereof.

21. The optical image capturing lens assembly of claim 11, wherein the seventh lens element has the object-side surface being convex in a paraxial region thereof.

22. The optical image capturing lens assembly of claim 11, wherein at least three of Abbe numbers of the first lens element, the second lens element, the third lens element, the fourth lens element, the fifth lens element, the sixth lens element and the seventh lens element are smaller than 40.

23. An imaging apparatus, comprising:
the optical image capturing lens assembly of claim 11; and
an image sensor disposed on the image surface of the optical image capturing lens assembly.

24. An electronic device, comprising:
the imaging apparatus of claim 23.

* * * * *